US012120025B2

(12) United States Patent
Chen et al.

(10) Patent No.: US 12,120,025 B2
(45) Date of Patent: Oct. 15, 2024

(54) PHYSICAL LAYER PREAMBLE DESIGN

(71) Applicant: QUALCOMM Incorporated, San Diego, CA (US)

(72) Inventors: Jialing Li Chen, San Diego, CA (US); Sameer Vermani, San Diego, CA (US); Bin Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/323,563

(22) Filed: May 18, 2021

(65) Prior Publication Data

US 2021/0367886 A1     Nov. 25, 2021

Related U.S. Application Data

(60) Provisional application No. 63/033,810, filed on Jun. 2, 2020, provisional application No. 63/027,337, filed on May 19, 2020.

(51) Int. Cl.
*H04L 45/74* (2022.01)
(52) U.S. Cl.
CPC .................. *H04L 45/74* (2013.01)
(58) Field of Classification Search
CPC ... H04L 45/74; H04L 27/2603; H04L 27/206; H04L 27/261; H04W 84/12
(Continued)

(56) References Cited

U.S. PATENT DOCUMENTS

2011/0286378 A1* 11/2011 Kim .................... H04W 4/06
                                                           370/312
2014/0169348 A1*  6/2014 Hassan .............. H04L 67/145
                                                           375/296
(Continued)

FOREIGN PATENT DOCUMENTS

EP          1928115 A1 *  6/2008  ......... H04L 27/0008
WO   WO-2018031134 A1     2/2018
WO   WO-2020009425 A1     1/2020

OTHER PUBLICATIONS

High-Accuracy Ranging Using a Dual-Channel IEEE 802.11 Legacy Preamble Anton Schlegel; Jeffrey A. Nanzer 2021 IEEE International Symposium on Antennas and Propagation and USNC-URSI Radio Science Meeting (APS/URSI) Year: 2021 | Conference Paper | Publisher: IEEE (Year: 2021).*

(Continued)

*Primary Examiner* — Charles C Jiang
*Assistant Examiner* — Rachel Elizabeth Marks
(74) *Attorney, Agent, or Firm* — Holland & Hart LLP

(57) ABSTRACT

This disclosure provides methods, devices and systems for generating packet preambles. Some implementations more specifically relate to preamble designs that support gains in data throughput achievable in accordance with the IEEE 802.11 be amendment, and future generations, of the IEEE 802.11 standard. Among other examples, the preamble designs of the present implementations may allow for more reliable packet detection, more accurate channel estimation, and more robust decoding of signal field (SIG) symbols. Additionally, or alternatively, the preamble designs of the present disclosure may be implemented with different lengths, modulation schemes, or transmit power compared to preamble designs that conform to existing versions of the IEEE 802.11 standard.

28 Claims, 19 Drawing Sheets

(58) Field of Classification Search
USPC .......................................................... 370/392
See application file for complete search history.

(56) References Cited

U.S. PATENT DOCUMENTS

| | | | | |
|---|---|---|---|---|
| 2017/0012791 | A1* | 1/2017 | Stacey | H04W 84/12 |
| 2017/0105143 | A1 | 4/2017 | Seok | |
| 2017/0303164 | A1* | 10/2017 | Chu | H04W 72/042 |
| 2019/0097850 | A1 | 3/2019 | Kenney et al. | |
| 2019/0380062 | A1 | 12/2019 | Seok | |
| 2020/0037325 | A1* | 1/2020 | Chu | H04W 74/085 |
| 2020/0136884 | A1* | 4/2020 | Park | H04L 27/2602 |
| 2020/0153575 | A1 | 5/2020 | Lim et al. | |
| 2020/0177425 | A1* | 6/2020 | Chen | H04L 27/2602 |
| 2021/0037570 | A1* | 2/2021 | Sugaya | H04L 69/22 |
| 2021/0067235 | A1* | 3/2021 | Jeon | H04L 27/261 |
| 2021/0266098 | A1* | 8/2021 | Cao | H04L 1/0069 |
| 2021/0266386 | A1* | 8/2021 | Cao | H04W 72/04 |

OTHER PUBLICATIONS

Performance comparison of the BPSK and QPSK modulation techniques on FPGA S. O. Popescu; A. S. Gontean 2011 IEEE 17th International Symposium for Design and Technology in Electronic Packaging (SIITME) (Year: 2011) (Year: 2011).*
Performance comparison of the BPSK and QPSK modulation techniques on FPGA S. O. Popescu; A. S. Gontean 2011 IEEE 17th International Symposium for Design and Technology in Electronic Packaging (SIITME) (Year: 2011).*
International Search Report and Written Opinion—PCT/US2021/033092—ISA/EPO—Sep. 10, 2021.
Lim D., et al., (LGE): "Further Discussion for 11be Preamble", IEEE Draft, 11-19-1486-07-00BE-Further-Discussion-for-11BE-Preamble, IEEE-SA Mentor, Piscataway, NJ USA vol. 802.11 EHT; 802.11be, No. 7, Nov. 14, 2019 (Nov. 14, 2019), pp. 1-19, XP068164764, Retrieved from the Internet: URL: https://mentor.ieee.org/802.11/dcn/19/11-19-1486-07-00be-further-discussion-for-11be-preamble.pptx [retrieved on Nov. 14, 2019] pp. 3, 13,14 p. 17.
Tian B., et al., (Qualcomm): "Thoughts on Extended Range (ER) Preamble", IEEE Draft, 11-20-1132-00-00BE-Thoughts-on-Extended-Range-Preamble, IEEE-SA Mentor, Piscataway, NJ USA , vol. 802.11 EHT; 802.11be, Sep. 10, 2020 (Sep. 10, 2020), pp. 1-4, XP068173535, Retrieved from the Internet: URL: https://mentor.ieee.org/802.11/dcn/20/11-20-1132-00-00be-thoughts-on-extended-range-preamble.pptx [retrieved on Sep. 10, 2020] p. 3.
Vermani S., et al., (Qualcomm): "Proposed Draft Text (PDT-PHY): An Update to Preamble: U-SIG," IEEE Draft, 11-20-1875-01-00BE-PDT-PHY-Update-to-Preamble-U-SIG, IEEE-SA Mentor, Piscataway, NJ USA, vol. 802.11 EHT, 802.11be, No. 1, Nov. 19, 2020 (Nov. 19, 2020), pp. 1-13, XP068175252, Retrieved from the Internet: URL: https://mentor.ieee.org/802.11/dcn/20/11-20-1875-01-00be-pdt-phy-update-to-preamble-u-sig.docx [retrieved on Nov. 19, 2020] p. 2-p. 4, p. 12; figure xxx.
Au E., "Specification Framework for TGbe", IEEE P802.11 Wireless LANs, IEEE 802.11-19/1262r9, May 6, 2020, pp. 1-20.
Lim D., et al., "Further Discussion for 11be Preamble", IEEE 802.11-19/1486r1, Sep. 16, 2019, XP068154005, pp. 1-19.
Broadcom: "Discussion on the Use of 802.11 Preamble for NR-U", 3GPP TSG RAN WG1 Meeting #96, R1-1903371, Athens, Greece, Feb. 25, 2019-Mar. 1, 2019, Feb. 27, 2019, 15 Pages.

\* cited by examiner

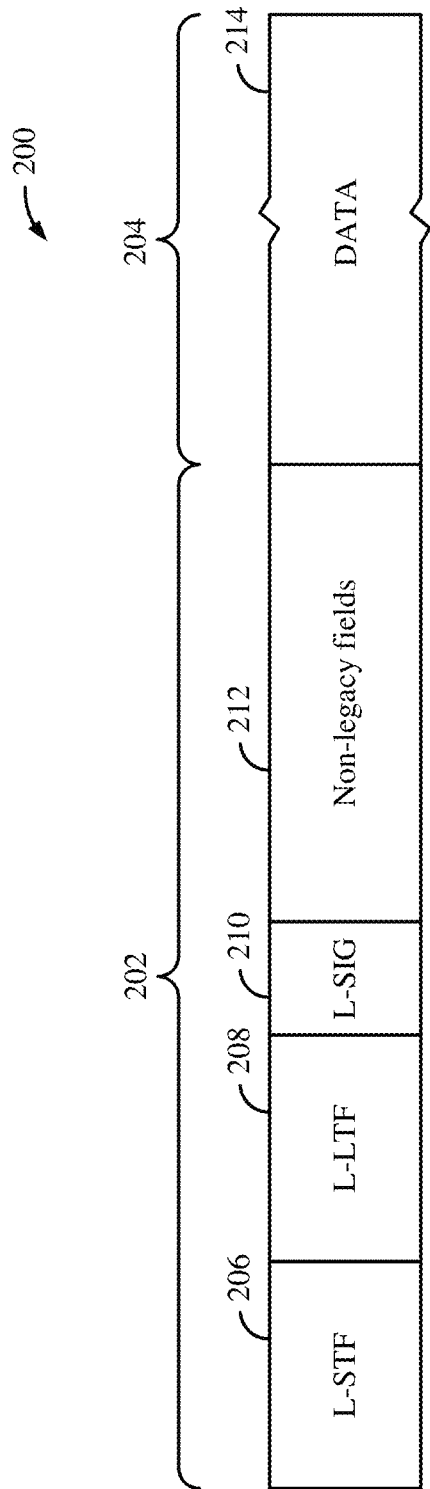
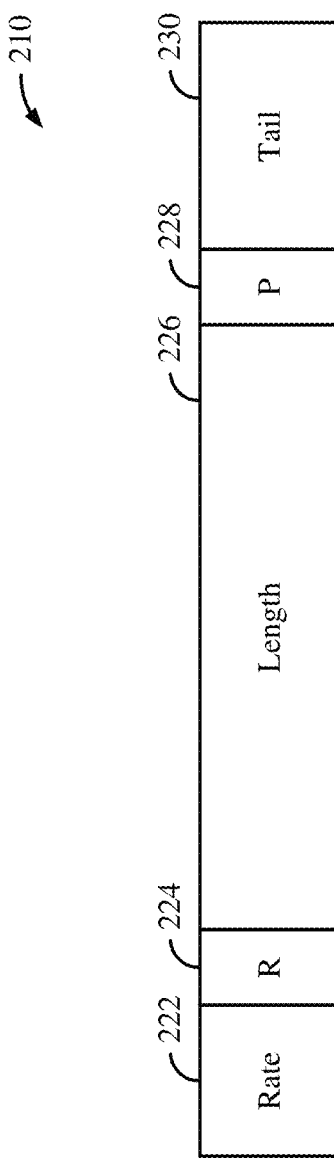
*Figure 2A*
*Figure 2B*

*Figure 8*

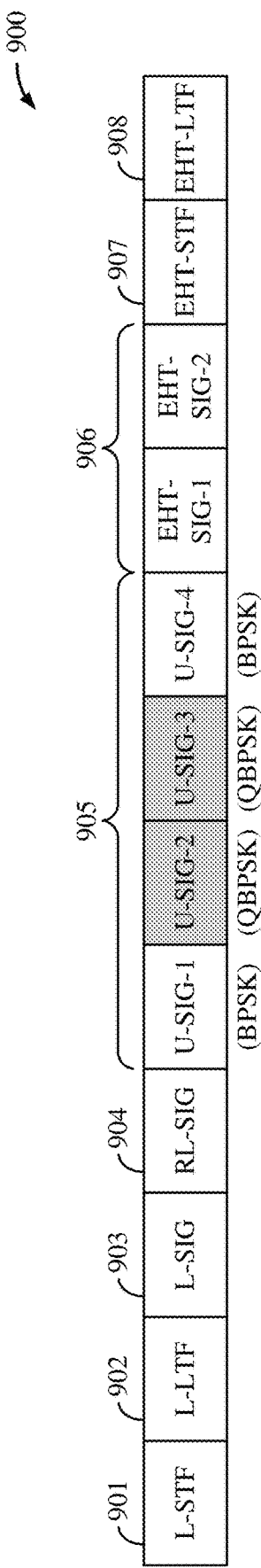
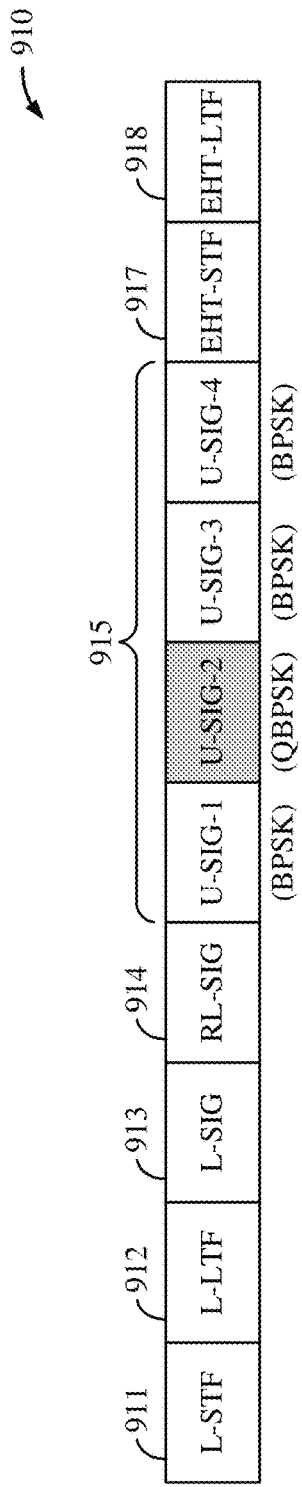
*Figure 9A*
*Figure 9B*

PHYSICAL LAYER PREAMBLE DESIGN

CROSS-REFERENCE TO RELATED APPLICATIONS

This patent application claims priority to U.S. Provisional Patent Application No. 63/027,337 entitled "PHYSICAL LAYER PREAMBLE DESIGN" and filed on May 19, 2020 and to U.S. Provisional Patent Application No. 63/033,810 entitled "PHYSICAL LAYER PREAMBLE FOR EXTENDED RANGE (ER) PACKET FORMAT" and filed on Jun. 2, 2020, both of which are assigned to the assignee hereof. The disclosures of all prior applications are considered part of and are incorporated by reference in this patent application.

TECHNICAL FIELD

This disclosure relates generally to wireless communication, and more specifically to physical layer preambles and signaling for wireless transmissions.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

New WLAN communication protocols are being developed to enable enhanced WLAN communication features. As new WLAN communication protocols enable enhanced features, new preamble designs are needed to support signaling regarding the new features and packet formats. Additionally, new preamble designs may be needed to ensure that such signaling can be reliably communicated over extended ranges such as, for example, in outdoor environments.

SUMMARY

The systems, methods and devices of this disclosure each have several innovative aspects, no single one of which is solely responsible for the desirable attributes disclosed herein.

One innovative aspect of the subject matter described in this disclosure can be implemented as a method of wireless communication. The method may be performed by a wireless communication device, and may include receiving a packet including a physical layer preamble that includes a legacy short training field (L-STF), a legacy long training field (L-LTF), a legacy signal field (L-SIG), a repeat of L-SIG (RL-SIG) that immediately follows L-SIG, and a universal signal field (U-SIG) that immediately follows RL-SIG and includes information for interpreting one or more subsequent fields of the packet, where L-SIG includes a length field having a value (L_LEN) that satisfies L_LEN %3=0; detecting one or more modulation schemes associated with U-SIG; and determining a format of the packet based on the detected modulation schemes associated with U-SIG. In some implementations, the detecting of the one or more modulation schemes may include determining that a first symbol of U-SIG is modulated according to a binary phase shift keying (BPSK) modulation scheme; and determining that a second symbol of U-SIG is modulated according to a quadrature BPSK (QBPSK) modulation scheme.

In some implementations, the determining of the format of the packet may include determining that U-SIG further includes at least a third symbol and a fourth symbol based on determining that the second symbol of U-SIG is modulated according to the QBPSK modulation scheme, where the first symbol of U-SIG carries the same coded bits as the second symbol of U-SIG and the third symbol of U-SIG carries the same coded bits as the fourth symbol of U-SIG. In some aspects, each of the first and second symbols may be transmitted on a plurality of subcarriers, where the coded bits of the first symbol are modulated on the plurality of subcarriers in a different order than the coded bits of the second symbol. In some aspects, each of the third and fourth symbols may be transmitted on a plurality of subcarriers, where the coded bits of the third symbol are modulated on the plurality of subcarriers in a different order than the coded bits of the fourth symbol.

In some implementations, the method may further include determining a timing of a non-legacy short training field (STF) of the physical layer preamble in relation to U-SIG based on the format of the packet; and initiating automatic gain control (AGC) based on the timing of the non-legacy STF. In some aspects, the packet may include one or more padding symbols between U-SIG and the non-legacy STF.

In some implementations, the determining of the format of the packet may include determining that the packet conforms with a non-legacy extended range (ER) packet format based on a value of a version identifier subfield of U-SIG and the determination that the second symbol of U-SIG is modulated according to the QBPSK modulation scheme. In some aspects, the preamble may further include a non-legacy signal field immediately following U-SIG, where the non-legacy signal field includes a single user field and one or more bits of overflow from U-SIG. In some aspects, U-SIG may include a user field carrying user-specific information for a single user, where the preamble further includes a non-legacy STF immediately following U-SIG.

Another innovative aspect of the subject matter described in this disclosure can be implemented in a wireless communication device. In some implementations, the wireless communication device may include at least one modem, at least one processor communicatively coupled with the at least one modem, and at least one memory communicatively coupled with the at least one processor and storing processor-readable code. In some implementations, execution of the processor-readable code by the at least one processor causes the wireless communication device to perform operations including receiving a packet including a physical layer preamble that includes an L-STF, an L-LTF, an L-SIG, an RL-SIG that immediately follows L-SIG, and a U-SIG that immediately follows RL-SIG and includes information for interpreting one or more subsequent fields of the packet, where L-SIG includes a length field having a value (L_LEN) that satisfies L_LEN %3=0; detecting one or more modulation schemes associated with U-SIG; and determining a format of the packet based on the detected modulation schemes associated with U-SIG. In some implementations, the detecting of the one or more modulation schemes may include determining that a first symbol of U-SIG is modulated according to a BPSK modulation scheme; and determining that a second symbol of U-SIG is modulated according to a QBPSK modulation scheme.

Another innovative aspect of the subject matter described in this disclosure can be implemented as a method of wireless communication. The method may be performed by a wireless communication device, and may include generating a packet including a physical layer preamble that includes an L-STF, an L-LTF, an L-SIG, an RL-SIG that immediately follows L-SIG, and a U-SIG that immediately follows RL-SIG and includes information for interpreting one or more subsequent fields of the packet, where L-SIG includes a length field having a value (L_LEN) that satisfies L_LEN %3=0; modulating a first symbol of U-SIG according to a BPSK modulation scheme; modulating a second symbol of U-SIG according to a QBPSK modulation scheme; and transmitting the packet over a wireless channel.

In some implementations, U-SIG may further include at least a third symbol and a fourth symbol, where the first symbol of U-SIG carries the same coded bits as the second symbol of U-SIG and the third symbol of U-SIG carries the same coded bits as the fourth symbol of U-SIG. In some aspects, the coded bits of the first symbol may be modulated on a plurality of subcarriers in a different order than the coded bits of the second symbol. In some aspects, the coded bits of the third symbol may be modulated on the plurality of subcarriers in a different order than the coded bits of the fourth symbol. In some aspects, the packet may include one or more padding symbols between U-SIG and a non-legacy STF of the physical layer preamble.

In some implementations, the packet may conform with a non-legacy ER packet format having a bandwidth equal to 20 MHz. In some aspects, the preamble may further include a non-legacy signal field immediately following U-SIG, where the non-legacy signal field includes a single user field and one or more bits of overflow from U-SIG. In some aspects, U-SIG may further include a user field carrying user-specific information for a single user, where the preamble further includes a non-legacy STF immediately following U-SIG.

Another innovative aspect of the subject matter described in this disclosure can be implemented in a wireless communication device. In some implementations, the wireless communication device may include at least one modem, at least one processor communicatively coupled with the at least one modem, and at least one memory communicatively coupled with the at least one processor and storing processor-readable code. In some implementations, execution of the processor-readable code by the at least one processor causes the wireless communication device to perform operations including generating a packet including a physical layer preamble that includes an L-STF, an L-LTF, an L-SIG, an RL-SIG that immediately follows L-SIG, and a U-SIG that immediately follows RL-SIG and includes information for interpreting one or more subsequent fields of the packet, where L-SIG includes a length field having a value (L_LEN) that satisfies L_LEN %3=0; modulating a first symbol of U-SIG according to a BPSK modulation scheme; modulating a second symbol of U-SIG according to a QBPSK modulation scheme; and transmitting the packet over a wireless channel.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

FIG. 2A shows an example protocol data unit (PDU) usable for communications between an access point (AP) and one or more wireless stations (STAs).

FIG. 2B shows an example field in the PDU of FIG. 2A.

FIG. 8 shows an example frame structure of a non-legacy PPDU allocated over multiple subchannels of a wireless channel according to some implementations.

FIG. 9A shows an example PHY preamble for a non-legacy PPDU according to some implementations.

FIG. 9B shows another example PHY preamble for a non-legacy PPDU according to some implementations.

Like reference numbers and designations in the various drawings indicate like elements.

DETAILED DESCRIPTION

Figure 1:
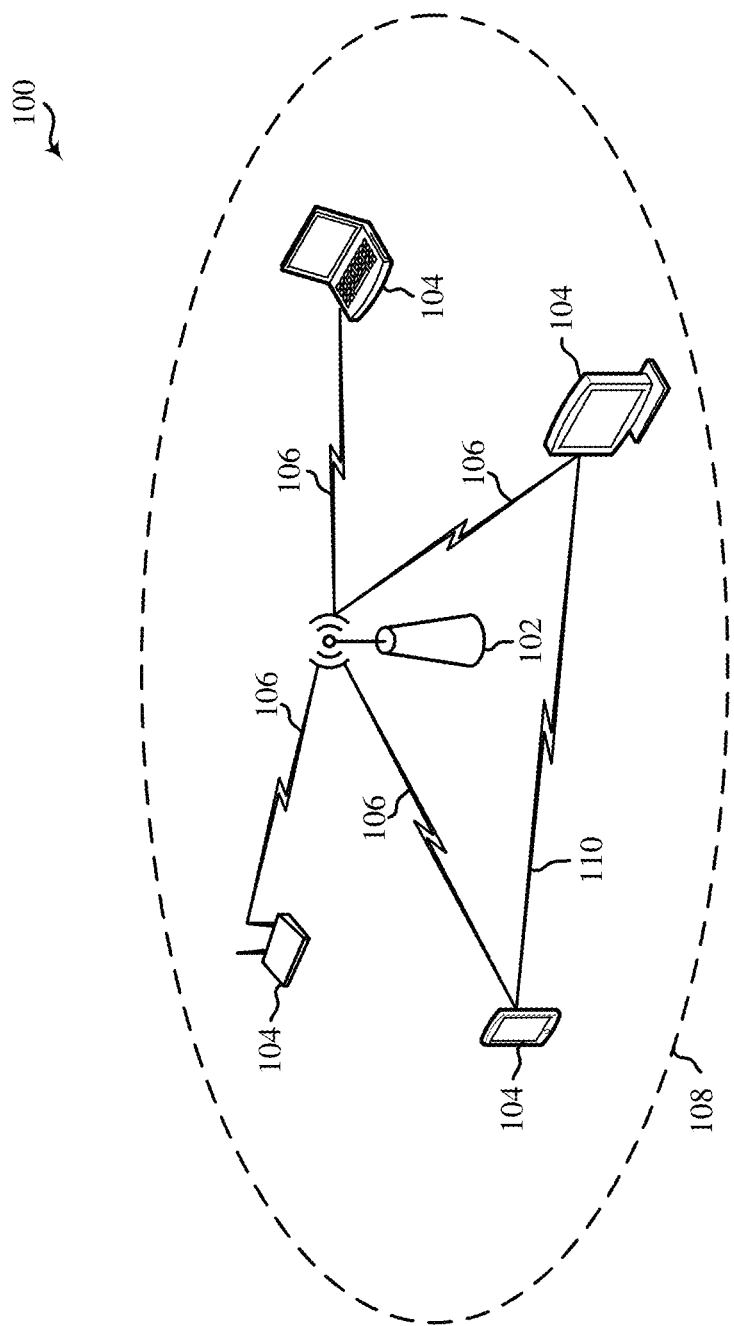
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (JOT) network.

New WLAN communication protocols are being developed to enable enhanced WLAN communication features. As new WLAN communication protocols enable enhanced features, new preamble designs are needed to support signaling regarding the new features and packet formats. Additionally, new preamble designs may be needed to ensure that such signaling can be reliably communicated over extended ranges such as, for example, in outdoor environments. Signaling refers to control fields or information that can be used by a wireless communication device to interpret another field or portion of a packet. Such information may be encoded in a physical layer (PHY) preamble of the packet. However, decoding and processing the signaling information consumes time and resources which may delay the processing of other information carried in the packet.

Various aspects relate generally to signaling included in a PHY preamble that supports new wireless communication protocols, and more particularly, to preamble designs that support extended range communications or gains in data throughput achievable in accordance with the IEEE 802.11be amendment, and future generations, of the IEEE 802.11 standard. In some aspects, the preamble designs of the present disclosure may be implemented with different lengths, modulation schemes, or frame structures compared to preamble designs that conform to existing versions of the IEEE 802.11 standard. For example, the information carried in one or more fields of the PHY preamble may be repeated (in time) to provide increased signaling gains at the receiving device. In some implementations, such information may be carried in a universal signal field (U-SIG) of the PHY preamble. In some other implementations, such information may be carried in a non-legacy signal field of the PHY preamble. As used herein, the term "non-legacy" may refer to packet formats and communication protocols conforming to the IEEE 802.11be amendment, and future generations, of the IEEE 802.11 standard.

Particular implementations of the subject matter described in this disclosure can be implemented to realize one or more of the following potential advantages. The preamble designs of the present implementations may allow for more reliable packet detection, more accurate channel estimation, and more robust decoding of signaling information in non-legacy packets. By adjusting the lengths, modulation schemes, or frame structures associated with the physical layer preamble, aspects of the present disclosure may also enable early detection of various content (or lack thereof) in the PHY preamble and provide the receiving device more time to process such content.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 700 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 may also include a non-legacy portion including one or more non-legacy fields 212, for example, conforming to an IEEE wireless communication protocol such as the IEEE 802.11ac, 802.11ax, 802.11be or later wireless communication protocol protocols.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (μs) or other time units.

Figure 3:
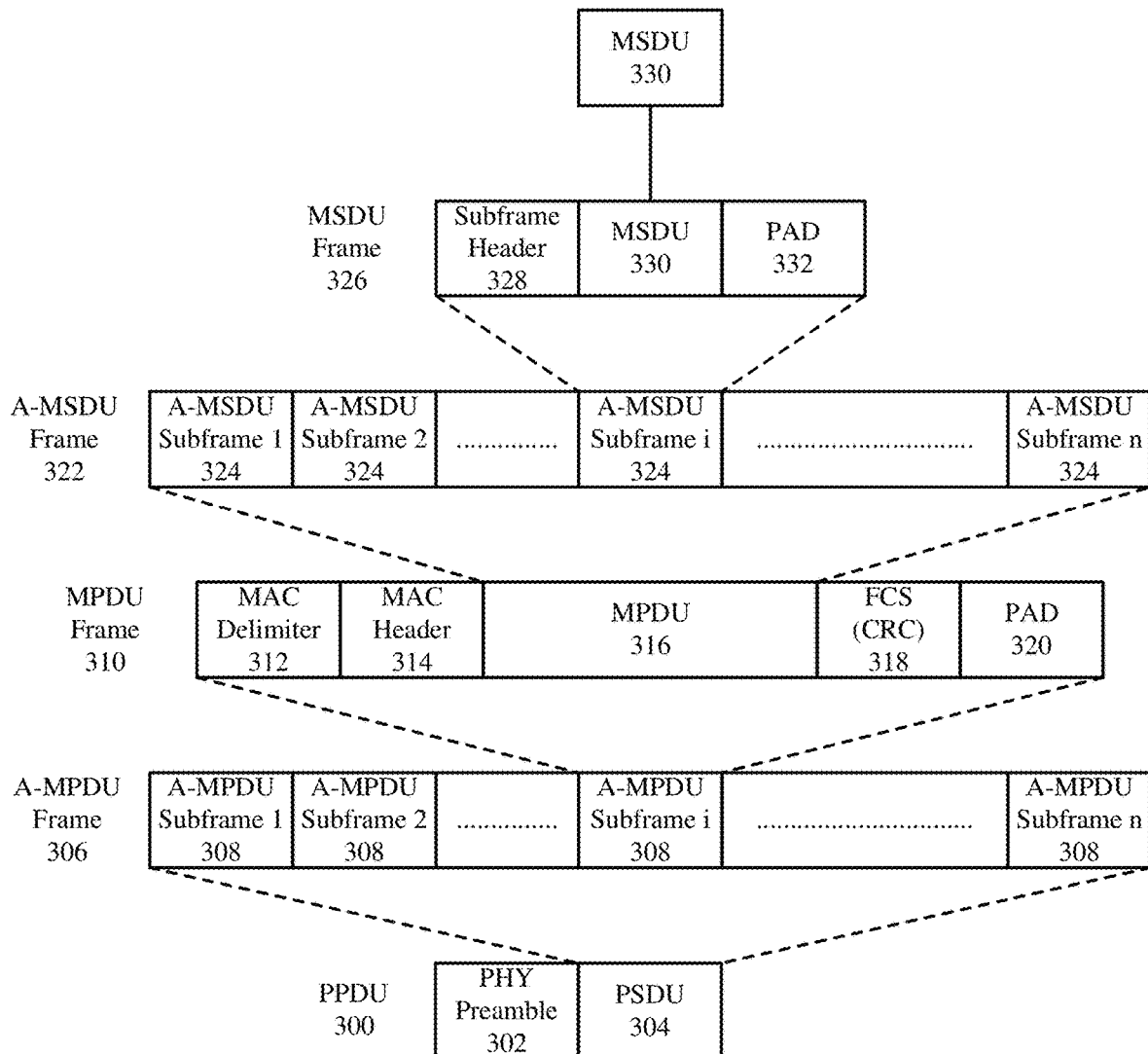
FIG. 3 shows an example physical layer (PHY) protocol data unit (PPDU) usable for communications between an AP and one or more STAs.

FIG. 3 shows an example PPDU 300 usable for communications between an AP 102 and one or more STAs 104. As described above, each PPDU 300 includes a PHY preamble 302 and a PSDU 304. Each PSDU 304 may represent (or "carry") one or more MAC protocol data units (MPDUs) 316. For example, each PSDU 304 may carry an aggregated MPDU (A-MPDU) 306 that includes an aggregation of multiple A-MPDU subframes 308. Each A-MPDU subframe 306 may include an MPDU frame 310 that includes a MAC delimeter 312 and a MAC header 314 prior to the accompanying MPDU 316, which comprises the data portion ("payload" or "frame body") of the MPDU frame 310. Each MPDU frame 310 may also include a frame check sequence (FCS) field 318 for error detection (for example, the FCS field may include a cyclic redundancy check (CRC)) and padding bits 320. The MPDU 316 may carry one or more MAC service data units (MSDUs) 330. For example, the MPDU 316 may carry an aggregated MSDU (A-MSDU) 322 including multiple A-MSDU subframes 324. Each A-MSDU subframe 324 contains a corresponding MSDU 330 preceded by a subframe header 328 and in some cases followed by padding bits 332.

Referring back to the MPDU frame 310, the MAC delimiter 312 may serve as a marker of the start of the associated MPDU 316 and indicate the length of the associated MPDU 316. The MAC header 314 may include multiple fields containing information that defines or indicates characteristics or attributes of data encapsulated within the frame body 316. The MAC header 314 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration, and enables the receiving device to establish its network allocation vector (NAV). The MAC header 314 also includes one or more fields indicating addresses for the data encapsulated within the frame body 316. For example, the MAC header 314 may include a combination of a source address, a transmitter address, a receiver address or a destination address. The MAC header 314 may further include a frame control field containing control information. The frame control field may specify a frame type, for example, a data frame, a control frame, or a management frame.

Figure 4:
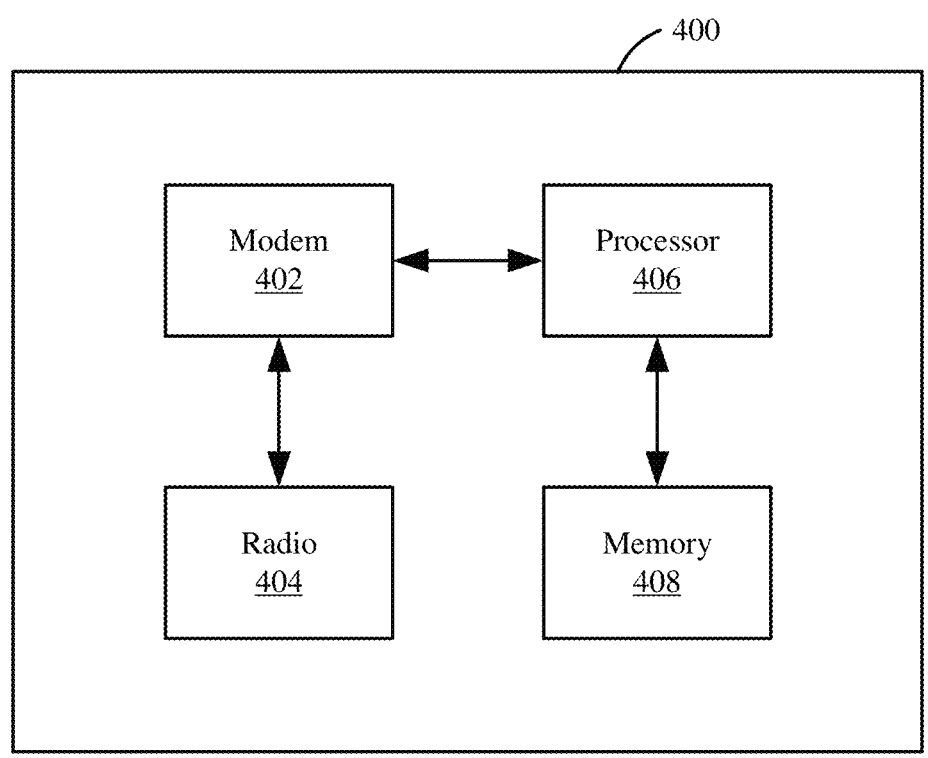
FIG. 4 shows a block diagram of an example wireless communication device.

FIG. 4 shows a block diagram of an example wireless communication device 400. In some implementations, the wireless communication device 400 can be an example of a device for use in a STA such as one of the STAs 104 described with reference to FIG. 1. In some implementations, the wireless communication device 400 can be an example of a device for use in an AP such as the AP 102 described with reference to FIG. 1. The wireless communication device 400 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 400 can be, or can include, a chip, system on chip (SoC), chipset, package or device that includes one or more modems 402, for example, a Wi-Fi (IEEE 802.11 compliant) modem. In some implementations, the one or more modems 402 (collectively "the modem 402") additionally include a WWAN modem (for example, a 3GPP 4G LTE or 5G compliant modem). In some implementations, the wireless communication device 400 also includes one or more radios 404 (collectively "the radio 404"). In some implementations, the wireless communication device 406 further includes one or more processors, processing blocks or processing elements 406 (collectively "the processor 406") and one or more memory blocks or elements 408 (collectively "the memory 408").

The modem 402 can include an intelligent hardware block or device such as, for example, an application-specific integrated circuit (ASIC) among other possibilities. The modem 402 is generally configured to implement a PHY layer. For example, the modem 402 is configured to modulate packets and to output the modulated packets to the radio 404 for transmission over the wireless medium. The modem 402 is similarly configured to obtain modulated packets received by the radio 404 and to demodulate the packets to provide demodulated packets. In addition to a modulator and a demodulator, the modem 402 may further include digital signal processing (DSP) circuitry, automatic gain control (AGC), a coder, a decoder, a multiplexer and a demultiplexer. For example, while in a transmission mode, data obtained from the processor 406 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 404. In implementations involving beamforming, the modulated symbols in the respective spatial streams are precoded via a steering matrix prior to their provision to the IFFT block.

While in a reception mode, digital signals received from the radio 404 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 406) for processing, evaluation or interpretation.

The radio 404 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 400 can include, or be coupled with, multiple transmit antennas (each with a corresponding transmit chain) and multiple receive antennas (each with a corresponding receive chain). The symbols output from the modem 402 are provided to the radio 404, which then transmits the symbols via the coupled antennas. Similarly, symbols received via the antennas are obtained by the radio 404, which then provides the symbols to the modem 402.

The processor 406 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 406 processes information received through the radio 404 and the modem 402, and processes information to be output through the modem 402 and the radio 404 for transmission through the wireless medium. For example, the processor 406 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 406 may generally control the modem 402 to cause the modem to perform various operations described above.

The memory 408 can include tangible storage media such as random-access memory (RAM) or read-only memory (ROM), or combinations thereof. The memory 408 also can store non-transitory processor- or computer-executable software (SW) code containing instructions that, when executed by the processor 406, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 5B:
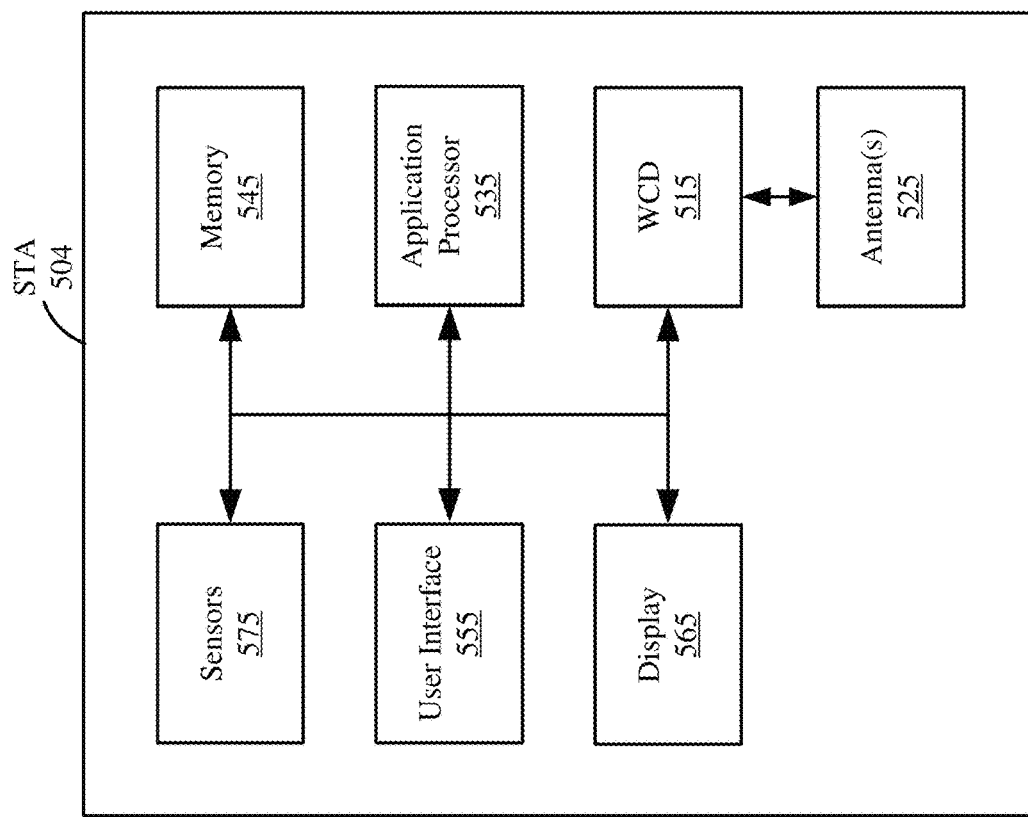
FIG. 5B shows a block diagram of an example STA.
Figure 5A:
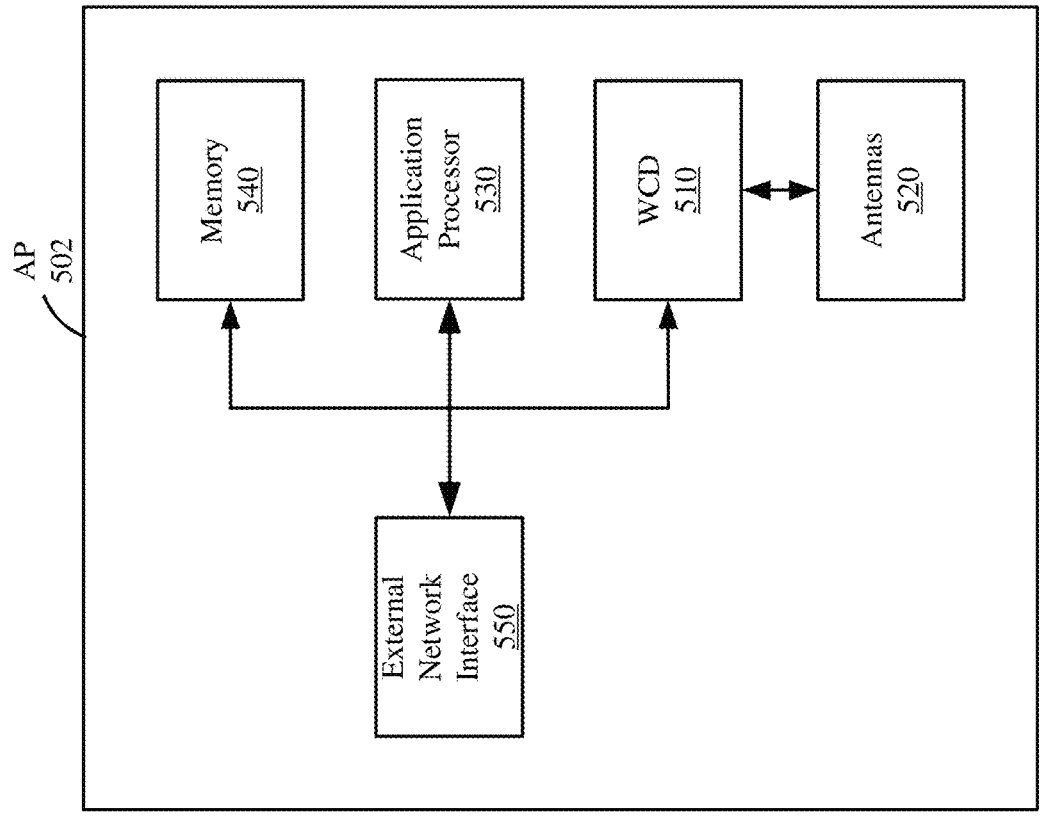
FIG. 5A shows a block diagram of an example AP.

FIG. 5A shows a block diagram of an example AP 502. For example, the AP 502 can be an example implementation of the AP 102 described with reference to FIG. 1. The AP 502 includes a wireless communication device (WCD) 510

(although the AP 502 may itself also be referred to generally as a wireless communication device as used herein). For example, the wireless communication device 510 may be an example implementation of the wireless communication device 400 described with reference to FIG. 4. The AP 502 also includes multiple antennas 520 coupled with the wireless communication device 510 to transmit and receive wireless communications. In some implementations, the AP 502 additionally includes an application processor 530 coupled with the wireless communication device 510, and a memory 540 coupled with the application processor 530. The AP 502 further includes at least one external network interface 550 that enables the AP 502 to communicate with a core network or backhaul network to gain access to external networks including the Internet. For example, the external network interface 550 may include one or both of a wired (for example, Ethernet) network interface and a wireless network interface (such as a WWAN interface). Ones of the aforementioned components can communicate with other ones of the components directly or indirectly, over at least one bus. The AP 502 further includes a housing that encompasses the wireless communication device 510, the application processor 530, the memory 540, and at least portions of the antennas 520 and external network interface 550.

FIG. 5B shows a block diagram of an example STA 504. For example, the STA 504 can be an example implementation of the STA 104 described with reference to FIG. 1. The STA 504 includes a wireless communication device 515 (although the STA 504 may itself also be referred to generally as a wireless communication device as used herein). For example, the wireless communication device 515 may be an example implementation of the wireless communication device 400 described with reference to FIG. 4. The STA 504 also includes one or more antennas 525 coupled with the wireless communication device 515 to transmit and receive wireless communications. The STA 504 additionally includes an application processor 535 coupled with the wireless communication device 515, and a memory 545 coupled with the application processor 535. In some implementations, the STA 504 further includes a user interface (UI) 555 (such as a touchscreen or keypad) and a display 565, which may be integrated with the UI 555 to form a touchscreen display. In some implementations, the STA 504 may further include one or more sensors 575 such as, for example, one or more inertial sensors, accelerometers, temperature sensors, pressure sensors, or altitude sensors. Ones of the aforementioned components can communicate with other ones of the components directly or indirectly, over at least one bus. The STA 504 further includes a housing that encompasses the wireless communication device 515, the application processor 535, the memory 545, and at least portions of the antennas 525, UI 555, and display 565.

Figure 6:
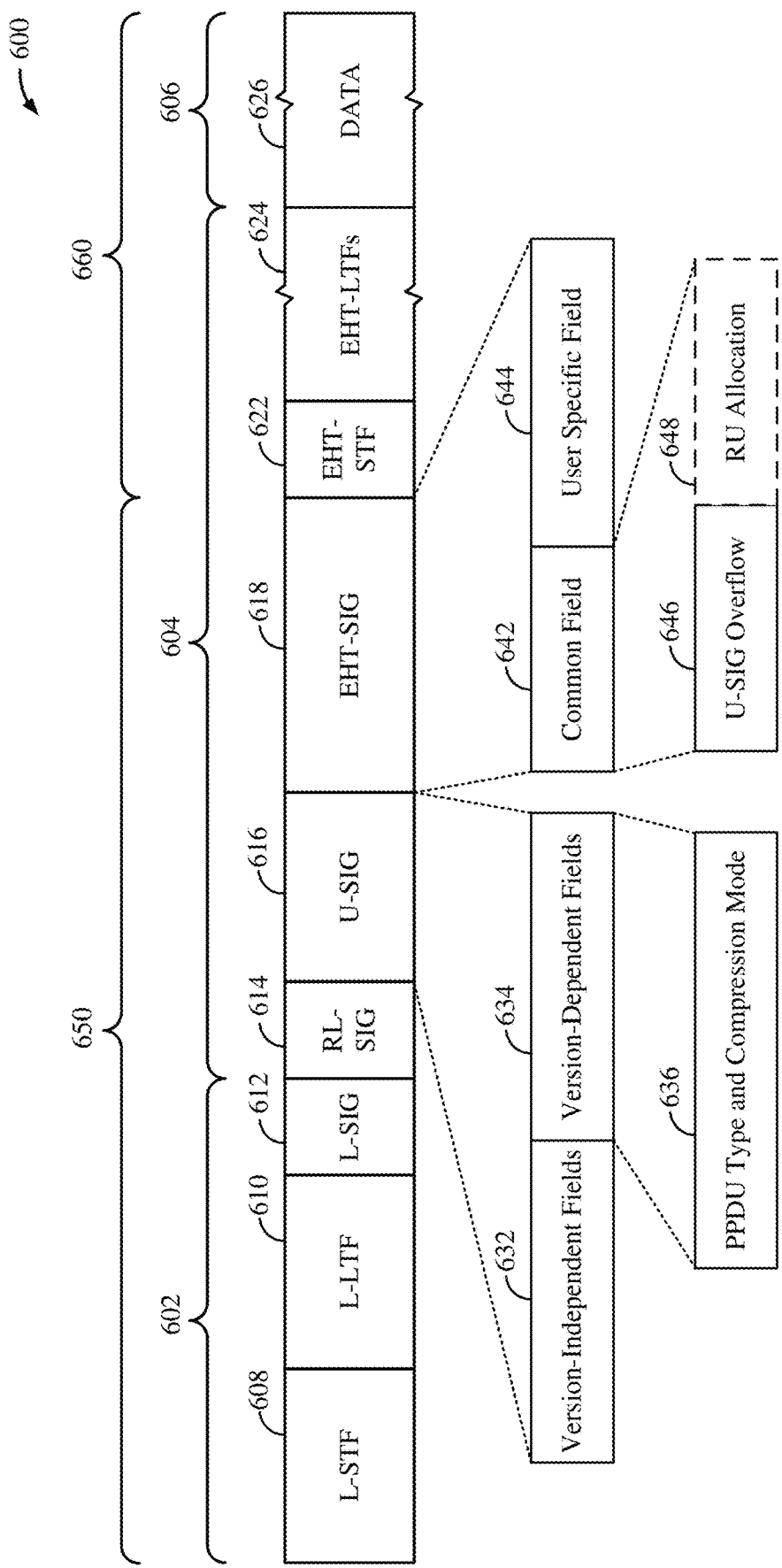
FIG. 6 shows an example PPDU usable for communications between an AP and a number of STAs according to some implementations.

FIG. 6 shows an example PPDU 600 usable for wireless communication between an AP and a number of STAs according to some implementations. The PPDU 600 may be used for transmission to a single user, MU-OFDMA or non-OFDMA MU-MIMO transmissions. The PPDU 600 includes a PHY preamble including a first portion 602 and a second portion 604. The PPDU 600 may further include a PHY payload 606 after the preamble, for example, in the form of a PSDU including DATA field 626.

The first portion 602 includes L-STF 608, L-LTF 610, and L-SIG 612. The second portion 604 of the preamble and DATA field 626 may be formatted as a non-legacy or Extremely High Throughput (EHT) WLAN preamble and frame, respectively, in accordance with the IEEE 802.11be amendment to the IEEE 802.11 wireless communication protocol standard, or may be formatted as a preamble and frame, respectively, conforming to any later (post-HE) version of a new wireless communication protocol conforming to a future IEEE 802.11 wireless communication protocol standard or other standard. In some implementations, the PPDU 600 may be logically partitioned into a pre-EHT modulated portion 650 (including PPDU fields 608-618) and an EHT modulated portion 660 (including PPDU fields 622-626).

The second portion 604 of the preamble includes a repeated legacy signal field (RL-SIG) 614 and multiple wireless communication protocol version-dependent signal fields after RL-SIG 614. For example, in some aspects, the second portion may include a universal signal field (U-SIG) 616 and an EHT signal field (EHT-SIG) 618. The second portion 604 further includes an EHT short training field (EHT-STF) 622 and a number of EHT long training fields (EHT-LTFs) 624.

In some implementations, U-SIG 616 may include one or more version-independent fields 632 and one or more version-dependent fields 634. Information in the version-independent fields 632 may include, for example, a version identifier (starting from the IEEE 802.11be amendment and beyond) and channel occupancy and coexistence information (such as a PPDU bandwidth). The version-dependent fields 634 may include format information fields used for interpreting other fields of U-SIG 616 and EHT-SIG 618. In some implementations, the version-dependent fields 634 may include at least a PPDU type and compression mode field 636. The PPDU type and compression mode field 636 may indicate a general PPDU format and compression mode for the PPDU 600. Example suitable PPDU formats include a trigger-based (TB) PPDU format, an MU PPDU format for DL OFDMA transmission, an MU PPDU format for transmission to a single user or for transmission of a null data packet (NDP), and an MU PPDU format for DL non-OFDMA MU-MIMO transmission.

In some implementations, EHT-SIG 618 may include a common field 642 and a user specific field 644. The common field 642 includes one or more bits or fields 646 overflowed from U-SIG 616 and RU allocation information 648 for intended recipients of the PPDU 600. The user specific field 644 may include one or more user fields carrying per-user information for one or more intended recipients of the PPDU 600. In some implementations, the RU allocation information 648 may be replaced by a number of non-OFDMA users field in an MU PPDU for DL non-OFDMA transmission or transmission to a single user. Still further, in some implementations, EHT-SIG 618 may be absent from the TB PPDU format.

As described previously, in IEEE 802.11be, and future generations, new fields may be used to carry signaling information. For example, the new fields and signaling information may be included in U-SIG 616. Additionally, new fields and signaling information may be included in EHT-SIG 618 (or may overflow from U-SIG 616 into EHT-SIG 618). In some implementations, U-SIG 616 may include signaling regarding types or formats of additional signal fields (such as EHT-SIG 618) that follow U-SIG 616. EHT-SIG 618 may be used by an AP to identify and inform one or more STAs 104 that the AP has scheduled UL or DL resources. EHT-SIG 618 may be decoded by each compatible STA 104 served by the AP 102. EHT-SIG 618 may generally be used by a receiving device to interpret bits in the DATA field 626. In the context of DL MU-OFDMA, such information enables the respective STAs 104 to identify and decode corresponding RUs in the associated DATA field 626.

Figure 7A:
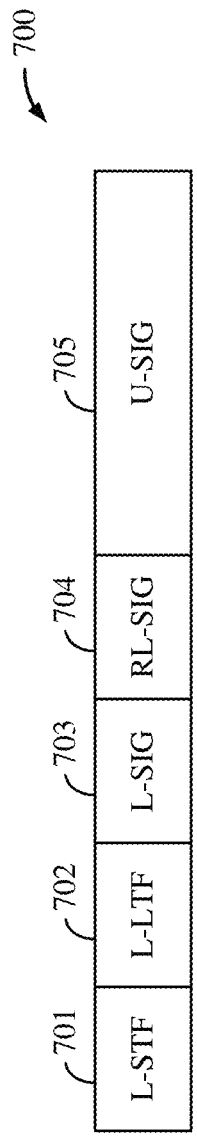
FIG. 7A shows an example frame structure for a trigger-based (TB) PPDU according to some implementations.

FIG. 7A shows an example frame structure for a TB PPDU 700 according to some implementations. In some implementations, the TB PPDU 700 may be one example of the PPDU 600 of FIG. 6. For simplicity, only the pre-EHT modulated portion of the TB PPDU 700 (corresponding to the portion 650 of PPDU 600) is shown in FIG. 7A. The TB PPDU 700 includes an L-STF 701, an L-LTF 702, an L-SIG 703, an RL-SIG 704, and a U-SIG 705 which may correspond to L-STF 608, L-LTF 610, L-SIG 612, RL-SIG 614, and U-SIG 616, respectively, of PPDU 600. In the example TB PPDU format, the TB PPDU 700 may not include an EHT-SIG. With reference for example to FIG. 6, the TB PPDU 700 may not include any U-SIG overflow 646, RU allocation information 648, or other user-specific information (such as provided in the user specific field 644).

Figure 7B:
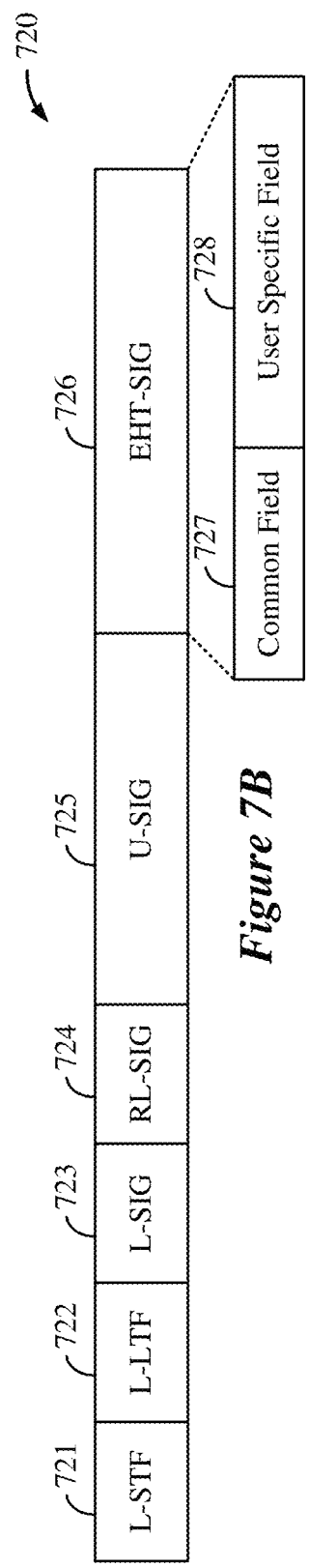
FIG. 7B shows an example frame structure for a multi-user (MU) PPDU according to some implementations.

FIG. 7B shows an example frame structure for a MU PPDU 720 according to some implementations. In some implementations, the MU PPDU 720 may be one example of the PPDU 600 of FIG. 6. For simplicity, only the pre-EHT modulated portion of the MU PPDU 720 (corresponding to the portion 650 of PPDU 600) is shown in FIG. 7B. The MU PPDU 720 includes an L-STF 721, an L-LTF 722, an L-SIG 723, an RL-SIG 724, a U-SIG 725, and an EHT-SIG 726 which may correspond to L-STF 608, L-LTF 610, L-SIG 612, RL-SIG 614, U-SIG 616, and EHT-SIG 616, respectively, of PPDU 600. In the example MU PPDU format, EHT-SIG 726 may include a common field 727 and a user specific field 728. With reference for example to FIG. 6, the common field 642 may further include U-SIG overflow 646 and RU allocation information 648. The user specific field 728 may include per-user information for one or more intended recipients of the MU PPDU 720.

In some implementations, the MU PPDU format may be used for a transmission to a single user or a non-OFDMA MU-MIMO transmission. More specifically, the transmission to a single user (when the PPDU Type and Compression Mode field of U-SIG is set to 1) and non-OFDMA MU-MIMO transmission (when the PPDU Type and Compression Mode field of U-SIG is set to 2) may be implemented by compressing (reducing or eliminating) one or more fields or subfields of the MU PPDU 720. For example, the RU allocation information may be omitted and there may be a number of non-OFDMA users field in EHT-SIG 726. The user specific field 728 includes a number of user fields (not shown for simplicity). The number of user fields may depend on the total number of users associated with the PPDU 720. When configured for transmission to a single user, a single user field may be formatted according to a non-MU-MIMO allocation format. The user field for a non-MU-MIMO allocation may include one or more subfields (such as NSS and beamformed subfields) that are not present in the user field for a MU-MIMO allocation. When the PPDU is configured for non-OFDMA MU-MIMO communications or an RU is configured for MU-MIMO transmission, multiple user fields may be formatted according to a MU-MIMO allocation format. The user field for a MU-MIMO allocation may include a spatial configuration subfield (indicating a number of spatial streams for a STA) that is not present in the user field for the non-MU-MIMO allocation.

As new WLAN communication protocols enable enhanced features, new preamble designs are needed to support signaling regarding the new features and packet formats. Various implementations relate generally to signaling included in a PHY preamble that supports new wireless communication protocols, and more particularly, to preamble designs that support extended range communications or gains in data throughput achievable in accordance with the IEEE 802.11be amendment, and future generations, of the IEEE 802.11 standard. In some implementations, the preamble designs of the present disclosure may be implemented with different lengths, modulation schemes, or frame structures compared to preamble designs that conform to existing versions of the IEEE 802.11 standard. For example, the information carried in one or more fields of the PHY preamble may be repeated (in time) to provide increased signaling gains at the receiving device. In some aspects, such information may be carried in a U-SIG of the PHY preamble. In some other aspects, such information may be carried in a non-legacy signal field of the PHY preamble.

Particular implementations of the subject matter described in this disclosure can be implemented to realize one or more of the following potential advantages. The preamble designs of the present implementations may allow for more reliable packet detection, more accurate channel estimation, and more robust decoding of signaling information in non-legacy packets. Signaling refers to control fields or information that can be used by a wireless communication device to interpret another field or portion of a packet. Such information may be encoded in the PHY preamble of the packet. However, decoding and processing the signaling information consumes time and resources which may delay the processing of other information carried in the packet. By adjusting the lengths, modulation schemes, or frame structures associated with the physical layer preamble, aspects of the present disclosure may allow early detection of various content (or lack thereof) in the physical layer preamble and provide the receiving device more time to process such content.

Figure 8:
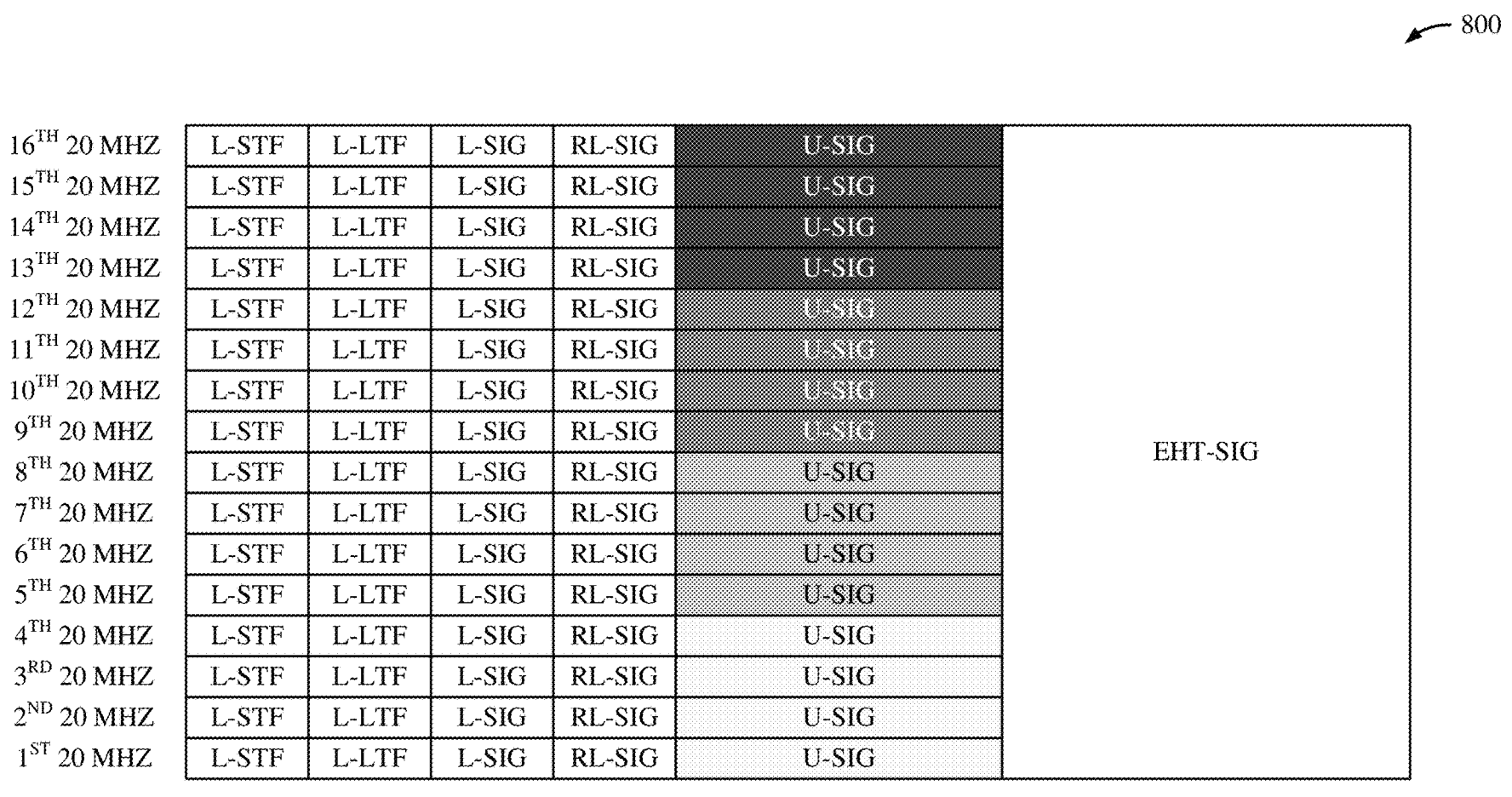

FIG. 8 shows an example frame structure of a non-legacy (for example, EHT) PPDU 800 allocated over multiple subchannels of a wireless channel according to some implementations. In some implementations, the EHT PPDU 800 may be one example of the PPDU 600 of FIG. 6. In the example of FIG. 8, the EHT PPDU 800 is shown to include an L-STF, an L-LTF, an L-SIG, an RL-SIG, a U-SIG, and an EHT-SIG signaled or transmitted on multiple 20 MHz subchannels (or frequency segments) of a 320 MHz wireless channel. In some other implementations, the wireless channel may encompass any range of frequencies including, but not limited to, a 160 MHz frequency spectrum, a 240 MHz frequency spectrum, a 480 MHz frequency spectrum, or a 640 MHz frequency spectrum. As shown in FIG. 8, the 320 MHz frequency spectrum includes sixteen 20 MHz subchannels indexed from lowest to highest (such as from the $1^{st}$ to the $16^{th}$).

In the example of FIG. 8, L-STF, L-LTF, L-SIG, and RL-SIG are duplicated or repeated in each 20 MHz subchannel spanning the entirety of the 320 MHz frequency spectrum. In some implementations, U-SIG may be duplicated or repeated in each 20 MHz subchannel of a respective one of four groupings of four consecutive 20 MHz subchannels, where each group of four consecutive 20 MHz subchannels correspond to one 80 MHz subblock within the PPDU bandwidth. For example, the first four subchannels ($1^{st}$ through $4^{th}$) may share the same U-SIG fields and values. The next four subchannels ($5^{th}$ through $8^{th}$) may share the same U-SIG fields and values, which may be different than the U-SIG fields or values of the previous four subchannels. The next four subchannels ($9^{th}$ through $12^{th}$) may share the same U-SIG fields and values, which in turn may be different than the U-SIG fields or values in any of the previous eight subchannels. The next four subchannels (13th through 16th) may share the same U-SIG fields and values, which in turn may be different than the U-SIG fields or values in any of the previous twelve subchannels. In other words, the U-SIG fields or values may change every 80 MHz. This may allow for greater parallelization of U-SIG information across the various subchannels.

In some implementations, EHT-SIG may be signaled on a number of content channels. Each content channel may be defined by a particular grouping of subchannels. For example, a first content channel may carry the signaling information for all odd-numbered subchannels (such as the 1st, 3rd, 5th, 7th, 9th, 11th, 13th, and 15th 20 MHz subchannels) and a second content channel may carry the signaling information for all even-numbered subchannels (such as the 2nd, 4th, 6th, 8th, 10th, 12th, 14th, and 16th 20 MHz subchannels). In some implementations, EHT-SIG may be duplicated or repeated per content channel. For example, the (odd-numbered) subchannels associated with the first content channel may share the same EHT-SIG fields and values. The (even-numbered) subchannels associated with the second content channel may share the same EHT-SIG fields and values, which may be different than the EHT-SIG fields or values of the first content channel.

Similar to U-SIG, the signaling contents of the same content channel of EHT-SIG in different 80 MHz subblocks may be different. The signaling contents of the two content channels of EHT-SIG within each 80 MHz subblock are mainly used by the receiving devices that process the non-legacy preamble in that particular 80 MHz subblock. Signaling information specific to other receiving devices that do not process the non-legacy preamble in one 80 MHz subblock may not be carried in the EHT-SIG in this particular 80 MHz subblock.

In some aspects, L-STF may be used for packet detection. In other words, a receiving device may detect the presence of a PPDU on the wireless channel responsive to detecting L-STF. In addition, short training fields (such as L-STF) may be used by the receiving device to perform automatic gain control (AGC) in the receiver. Through AGC, the receiver may be configured to receive subsequent portions of the PPDU. To ensure that a substantial portion of L-STF can be used for AGC, it is desirable for the receiving device to detect L-STF early in the transmission of the PPDU. Aspects of the present disclosure recognize that a receiving device may achieve more reliable packet detection (or detection of L-STF) by opening up its bandwidth of detection beyond 20 MHz.

With reference for example to FIG. 8, L-STF is duplicated or repeated on each of the 20 MHz subchannels spanning the bandwidth of the EHT PPDU 800. Specifically, the EHT PPDU 800 includes 16 repetitions of L-STF (in frequency) across the 16 20-MHz subchannels, respectively. In some implementations, a receiving device may listen for L-STF on multiple 20 MHz subchannels. In this manner, the receiving device may leverage the repetitions of L-STF in an EHT PPDU to achieve greater gain in L-STF detection. In other words, by listening for L-STF on multiple 20 MHz subchannels, a receiving device may detect an EHT PPDU earlier or more reliably than would otherwise be possible by listening for L-STF on any single 20 MHz subchannel.

In contrast to L-STF, U-SIG and EHT-SIG may not be duplicated or repeated on each 20 MHz subchannel of an EHT PPDU. With reference for example to FIG. 8, the information in U-SIG may change every 80 MHz, while the information in EHT-SIG may be different for each content channel and may change every 80 MHz. Due to content variations in U-SIG and EHT-SIG, the achievable gain resulting from repetitions in frequency may be significantly reduced. In some implementations, to compensate for the limited number of repetitions in the frequency domain, U-SIG or EHT-SIG may be repeated in the time domain. For example, the information in U-SIG may be carried on two unique U-SIG symbols in the time domain. With repetition, the same information may be duplicated or repeated on two additional U-SIG symbols. As a result, the U-SIG field may have an overall symbol duration equal to four U-SIG symbols (referred to sequentially, in time, as "U-SIG-1," "U-SIG-2," "U-SIG-3," and "U-SIG-4").

In some implementations, U-SIG-2 may be a duplicate or repetition of U-SIG-1 and U-SIG-4 may be a duplicate or repetition of U-SIG-3. In other words, U-SIG-1 and U-SIG-2 may carry the same coded bits and U-SIG-3 and U-SIG-4 may carry the same coded bits. To indicate the presence of repetitions to a receiving device, the second U-SIG symbol (U-SIG-2) may be modulated according to a different modulation scheme than the first U-SIG symbol (U-SIG-1). For example, U-SIG-1 may be modulated using BPSK. In some implementations, U-SIG-2 may be modulated using quadrature BPSK (QBPSK). In response to detecting the change in modulation scheme from U-SIG-1 to U-SIG-2 (or detecting the modulation scheme associated with U-SIG-2), a receiving device may continue listening for two additional U-SIG symbols (U-SIG-3 and U-SIG-4).

In some aspects, an ordering of the coded bits carried on U-SIG-1 may be different than an ordering of the coded bits carried on U-SIG-2. In some other aspects, an ordering of the coded bits carried on U-SIG-3 may be different than an ordering of the coded bits carried on U-SIG-4. For example, the sequence of coded bits associated with each U-SIG symbol may be mapped to a corresponding sequence of modulation symbols using a known modulation scheme (such as BPSK or QBPSK). Each modulation symbol may be modulated on a different tone or subcarrier within a given 20 MHz subchannel. In some instances, interference in the wireless channel (such as a deep fade) may prevent the transmission of modulation symbols on one or more of the subcarriers. Thus, by changing the order in which the modulation symbols are modulated on the different subcarriers (between two consecutive or duplicate U-SIG symbols), aspects of the present disclosure may increase transmit diversity and further improve the signaling gains achievable through repetition of U-SIG symbols. In some implementations, the coded bits carried on U-SIG-1 and U-SIG-3 may go through interleaving, while the coded bits carried on U-SIG-2 and U-SIG-4 may not go through interleaving.

The information in EHT-SIG may be carried on one or more unique EHT-SIG symbols (without repetition in the time domain) in a PPDU configured for transmission to a single user, DL OFDMA, or non-OFDMA MU-MIMO. With repetition, the same information may be duplicated or repeated on one or more additional EHT-SIG symbols. As a result, the EHT-SIG field may have an overall symbol duration equal to double the number of EHT-SIG symbols without repetition. In some implementations, each unique EHT-SIG symbol may be followed immediately by its repetition. For example, if EHT-SIG has an overall symbol duration equal to four EHT-SIG symbols, the first EHT-SIG symbol (EHT-SIG-1) may be a unique EHT-SIG symbol, the second EHT-SIG symbol (EHT-SIG-2) may be a repetition of EHT-SIG-1, the third EHT-SIG symbol (EHT-SIG-3) may be another unique EHT-SIG symbol, and the fourth EHT-SIG symbol (EHT-SIG-4) may be a repetition of EHT-SIG- 3. As such, EHT-SIG-2 and EHT-SIG-4 may carry the same coded bits as EHT-SIG-1 and EHT-SIG-3, respectively. In some other implementations, all unique EHT-SIG symbols may precede any repetitions of the EHT-SIG symbols. For example, if EHT-SIG has an overall symbol duration equal to four EHT-SIG symbols, the first and second EHT-SIG symbols (EHT-SIG-1 and EHT-SIG-2) may be unique EHT-SIG symbols while the third and fourth EHT-SIG symbols (EHT-SIG-3 and EHT-SIG-4) may be repetitions of the first and second EHT-SIG symbols, respectively. As such, EHT-SIG-3 and EHT-SIG 4 may carry the same coded bits as EHT-SIG-1 and EHT-SIG-2, respectively.

A receiving device may detect the presence of repetition in EHT-SIG based on the modulation scheme associated with U-SIG-2 (or a change in modulation schemes between U-SIG-1 and U-SIG-2). In some aspects, an ordering of the coded bits carried on each unique EHT-SIG symbol may be different than an ordering of the coded bits carried on the repetition of that EHT-SIG symbol, for example, to increase transmit diversity and further improve the signaling gains achievable through repetition of EHT-SIG symbols. In some implementations, the coded bits carried on the unique EHT-SIG symbols may go through interleaving, while the coded bits carried on the repetitions of the EHT-SIG symbols may not go through interleaving.

Aspects of the present disclosure recognize that EHT-SIG may not be present in some PPDU formats (such as the TB PPDU 700 of FIG. 7A). The presence of EHT-SIG (or lack thereof) may affect the timing of one or more subsequent fields of an EHT PPDU. With reference for example to FIG. 6, a non-legacy STF (such as EHT-STF) may follow immediately after EHT-SIG in the SU and MU PPDU formats (such as shown in FIG. 7B) and may follow immediately after U-SIG in the TB PPDU format. Similar to L-STF, EHT-STF may be used by the receiving device to perform AGC in the receiver. More specifically, the receiving device may use EHT-STF to reconfigure its receiver to receive the EHT modulated portion of the PPDU. Thus, it is desirable for the receiving device to detect EHT-STF early such that a substantial portion of EHT-STF can be used for AGC. In particular, it may be desirable for the receiving device to know whether EHT-STF follows immediately after U-SIG or after EHT-SIG.

As described above, the presence of EHT-SIG depends on the PPDU format being implemented for a particular transmission. The PPDU format may be indicated in a particular field or subfield of U-SIG (such as the PPDU type and compression mode field 636 of FIG. 6). However, decoding and processing the information in U-SIG consumes time and resources, which may delay the detection or processing of EHT-STF. In some implementations, the presence (or absence) of EHT-SIG in an EHT PPDU preamble may be indicated by changing the modulation scheme associated with one or more U-SIG symbols. For example, the third symbol of U-SIG (U-SIG-3) may be modulated according to QBPSK or BPSK to indicate that EHT-SIG is present or absent, respectively, from the preamble. In response to detecting that U-SIG-3 is modulated using QBPSK, a receiving device may anticipate EHT-STF to occur at least two symbol durations (depending on the duration of EHT-SIG) after U-SIG. In response to detecting that U-SIG-3 is modulated using BPSK, a receiving device may anticipate EHT-STF to occur immediately after U-SIG.

Aspects of the present disclosure also recognize that the presence of EHT-SIG may provide a buffer (or additional time) for the receiving device to decode and process the information in U-SIG, and thus determine the start of EHT-STF. In other words, when EHT-SIG is present in the preamble, the receiving device may determine the presence of EHT-SIG (based on the PPDU format indicated in U-SIG) before it begins receiving EHT-STF. However, when EHT-SIG is absent from the preamble, the receiving device may not be able to determine the absence of EHT-SIG (based on the PPDU format indicated in U-SIG) before it begins receiving EHT-STF. In some implementations, in the absence of EHT-SIG (such as in TB PPDUs), one or more padding symbols may be inserted between U-SIG and EHT-STF to provide a buffer (similar to EHT-SIG) for the receiving device to decode and process the information in U-SIG, and thus determine the start of EHT-STF.

FIG. 9A shows an example PHY preamble 900 for a non-legacy PPDU according to some implementations. In some implementations, the PHY preamble 900 may be one example of the PHY preamble, which includes portions 602 and 604, of FIG. 6. The PHY preamble 900 includes L-STF 901, L-LTF 902, L-SIG 903, RL-SIG 904, U-SIG 905, EHT-SIG 906, EHT-STF 907, and EHT-LTF 908. In the example of FIG. 9A, U-SIG 905 includes four U-SIG symbols (U-SIG-1, U-SIG-2, U-SIG-3, and U-SIG-4) and EHT-SIG 906 includes two EHT-SIG symbols (EHT-SIG-1 and EHT-SIG-2). More specifically, U-SIG-2 may be a duplicate of U-SIG-1, U-SIG-4 may be a duplicate of U-SIG-3, and EHT-SIG2 may be a duplicate of EHT-SIG-1. In some implementations, U-SIG-2 may be modulated using QBPSK to indicate that the PHY preamble 900 includes repetitions in U-SIG 905 and EHT-SIG 906. In some other implementations, U-SIG-3 also may be modulated using QBPSK to indicate (at the PHY level) the presence of EHT-SIG 906.

A receiving device may detect the PHY preamble 900 based on L-STF 901. In some implementations, the receiving device may detect L-STF 901 on multiple 20 MHz subchannels. The receiving device may further detect the presence of U-SIG 905 in the PHY preamble 900 based on a combination of L-SIG 903 and RL-SIG 904. For example, the receiving device may determine, based on the presence of RL-SIG 904, that the PPDU conforms with the IEEE 802.11ax amendment, or later generation, of the IEEE 802.11 standard. The receiving device may further determine, based on a length field (L_LEN) of L-SIG 903, that the PPDU also conforms with the IEEE 802.11be amendment to the IEEE 802.11 standard (where L_LEN %3==0).

The receiving device may further determine that U-SIG-2 is modulated using QBPSK. Based on this determination, the receiving device may determine that U-SIG 905 includes two additional U-SIG symbols (U-SIG-3 and U-SIG-4). In some implementations, the receiving device also may determine that EHT-SIG 906 includes one or more additional EHT-SIG symbols (EHT-SIG-2) based on the determination that U-SIG-2 is modulated using QBPSK. The receiving device may further determine that U-SIG-3 is also modulated using QBPSK. In response to this determination, the receiving device may determine that one or more additional fields or subfields (such as EHT-SIG 906) immediately follow U-SIG 905, prior to EHT-STF 907. Accordingly, the receiving device may prepare to initiate or perform AGC beginning two symbol durations after U-SIG 905.

FIG. 9B shows another example PHY preamble 910 for a non-legacy PPDU according to some implementations. In some implementations, the PHY preamble 910 may be one example of the PHY preamble, which includes portions 602 and 604, of FIG. 6. The PHY preamble 910 includes L-STF 911, L-LTF 912, L-SIG 913, RL-SIG 914, U-SIG 915, EHT-STF 917, and EHT-LTF 918. In the example of FIG.

9B, U-SIG 915 includes four U-SIG symbols (U-SIG-1, U-SIG-2, U-SIG-3, and U-SIG-4). More specifically, U-SIG-2 may be a duplicate of U-SIG-1 and U-SIG-4 may be a duplicate of U-SIG-3. In some implementations, U-SIG-2 may be modulated using QBPSK to indicate that the PHY preamble 910 includes repetitions in U-SIG 915. In some other implementations, U-SIG-3 may be modulated using BPSK to indicate (at the PHY level) the absence of an EHT-SIG.

A receiving device may detect the PHY preamble 910 based on L-STF 911. In some implementations, the receiving device may detect L-STF 911 on multiple 20 MHz subchannels. The receiving device may further detect the presence of U-SIG 915 in the PHY preamble 910 based on a combination of L-SIG 913 and RL-SIG 914. For example, the receiving device may determine, based on the presence of RL-SIG 914, that the PPDU conforms with the IEEE 802.11ax amendment, or later generation, of the IEEE 802.11 standard. The receiving device may further determine, based on a length field (L_LEN) of L-SIG 913, that the PPDU also conforms with the IEEE 802.11be amendment to the IEEE 802.11 standard (where L_LEN %3==0).

The receiving device may further determine that U-SIG-2 is modulated using QBPSK. Based on this determination, the receiving device may determine that U-SIG 915 includes two additional U-SIG symbols (U-SIG-3 and U-SIG-4). The receiving device may further determine that U-SIG-3 is modulated using BPSK. In response to this determination, the receiving device may determine that EHT-STF 917 immediately follows U-SIG 915. Accordingly, the receiving device may prepare to initiate or perform AGC beginning immediately after U-SIG 915.

Figure 10A:
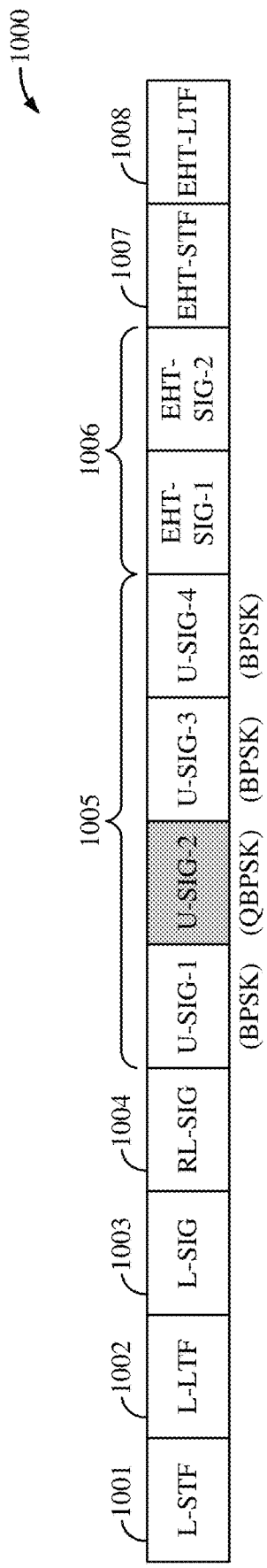
FIG. 10A shows an example PHY preamble for non-legacy PPDU according to some implementations.

FIG. 10A shows an example PHY preamble 1000 for a non-legacy PPDU according to some implementations. In some implementations, the PHY preamble 1000 may be one example of the PHY preamble, which includes portions 602 and 604, of FIG. 6. The PHY preamble 1000 includes L-STF 1001, L-LTF 1002, L-SIG 1003, RL-SIG 1004, U-SIG 1005, EHT-SIG 1006, EHT-STF 1007, and EHT-LTF 1008. In the example of FIG. 10A, U-SIG 1005 includes four U-SIG symbols (U-SIG-1, U-SIG-2, U-SIG-3, and U-SIG-4) and EHT-SIG 1006 includes two EHT-SIG symbols (EHT-SIG-1 and EHT-SIG-2). More specifically, U-SIG-2 may be a duplicate of U-SIG-1, U-SIG-4 may be a duplicate of U-SIG-3, and EHT-SIG2 may be a duplicate of EHT-SIG-1. In some implementations, U-SIG-2 may be modulated using QBPSK to indicate that the PHY preamble 1000 includes repetitions in U-SIG 1005 and EHT-SIG 1006. However, unlike the implementations described with reference to FIGS. 9A and 9B, U-SIG-3 is not modulated using QBPSK to indicate the presence of EHT-SIG 1006.

A receiving device may detect the PHY preamble 1000 based on L-STF 1001. In some implementations, the receiving device may detect L-STF 1001 on multiple 20 MHz subchannels. The receiving device may further detect the presence of U-SIG 1005 in the PHY preamble 1000 based on a combination of L-SIG 1003 and RL-SIG 1004. For example, the receiving device may determine, based on the presence of RL-SIG 1004, that the PPDU conforms with the IEEE 802.11ax amendment, or later generation, of the IEEE 802.11 standard. The receiving device may further determine, based on a length field (L_LEN) of L-SIG 1003, that the PPDU also conforms with the IEEE 802.11be amendment to the IEEE 802.11 standard (where L_LEN %3==0).

The receiving device may further determine that U-SIG-2 is modulated using QBPSK. Based on this determination, the receiving device may determine that U-SIG 1005 includes two additional U-SIG symbols (U-SIG-3 and U-SIG-4). In some implementations, the receiving device also may determine that EHT-SIG 1006 includes one or more additional EHT-SIG symbols (EHT-SIG-2) based on the determination that U-SIG-2 is modulated using QBPSK. Upon decoding and processing U-SIG 1005, the receiving device may further determine that the PHY preamble 1000 includes EHT-SIG 1006. For example, the receiving device may determine that the PHY preamble 1000 is implemented in accordance with an MU PPDU format (based on PPDU Type and Compression Mode field in U-SIG 1005) and know the length of the EHT-SIG field based on the number of EHT-SIG symbols field in U-SIG 1005. In some implementations, the receiving device may detect the PPDU format while receiving at least a portion of EHT-SIG 1006. Accordingly, the receiving device may prepare to initiate or perform AGC immediately following EHT-SIG 1006.

Figure 10B:
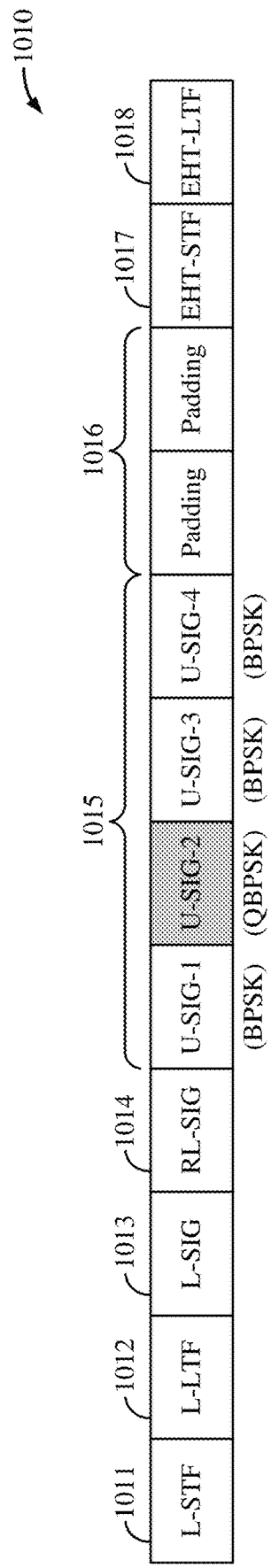
FIG. 10B shows another example PHY preamble for a non-legacy PPDU according to some implementations.

FIG. 10B shows another example PHY preamble 1010 for a non-legacy PPDU according to some implementations. In some implementations, the PHY preamble 1010 may be one example of the PHY preamble, which includes portions 602 and 604, of FIG. 6. The PHY preamble 1010 includes L-STF 1011, L-LTF 1012, L-SIG 1013, RL-SIG 1014, U-SIG 1015, padding 1016, EHT-STF 1017, and EHT-LTF 1018. In the example of FIG. 10B, U-SIG 1015 includes four U-SIG symbols (U-SIG-1, U-SIG-2, U-SIG-3, and U-SIG-4). More specifically, U-SIG-2 may be a duplicate of U-SIG-1 and U-SIG-4 may be a duplicate of U-SIG-3. In some implementations, U-SIG-2 may be modulated using QBPSK to indicate that the PHY preamble 1010 includes repetitions in U-SIG 1015.

A receiving device may detect the PHY preamble 1010 based on L-STF 1011. In some implementations, the receiving device may detect L-STF 1011 on multiple 20 MHz subchannels. The receiving device may further detect the presence of U-SIG 1015 in the PHY preamble 1010 based on a combination of L-SIG 1013 and RL-SIG 1014. For example, the receiving device may determine, based on the presence of RL-SIG 1014, that the PPDU conforms with the IEEE 802.11ax amendment, or later generation, of the IEEE 802.11 standard. The receiving device may further determine, based on a length field (L_LEN) of L-SIG 1013, that the PPDU also conforms with the IEEE 802.11be amendment to the IEEE 802.11 standard (where L_LEN %3==0).

The receiving device may further determine that U-SIG-2 is modulated using QBPSK. Based on this determination, the receiving device may determine that U-SIG 1015 includes two additional U-SIG symbols (U-SIG-3 and U-SIG-4). Upon decoding and processing U-SIG 1015, the receiving device may further determine that the PHY preamble 1010 does not include an EHT-SIG. For example, the receiving device may determine that the PHY preamble 1010 is implemented in accordance with a TB PPDU format (based on PPDU Type and Compression Mode field in U-SIG 1015). In some implementations, the receiving device may detect the PPDU format while receiving the padding symbols 1016. Accordingly, the receiving device may prepare to initiate or perform AGC immediately following processing of U-SIG 1015.

Aspects of the present disclosure recognize that the packet formats described above with reference to FIGS. 9A-10B also may facilitate communications over extended ranges. For example, existing versions of the IEEE 802.11 standards support extended range (ER) packet formats suitable for wireless communication over greater distances such as, for example, in outdoor environments. In particular, the IEEE 802.11ax amendment of the IEEE 802.11 standard defines an HE ER SU PPDU format which includes a repeated HE signal field (HE-SIG-A). In other words, the information carried on HE-SIG-A is transmitted twice in the PHY preamble. Because HE-SIG-A carries signaling necessary to decode or interpret subsequent fields or portions of an HE PPDU, the repetition of HE-SIG-A enables more robust and reliable transmission of an HE ER SU PPDU over greater distances. Similarly, the repetition of U-SIG (and EHT-SIG) in the packet formats described above with reference to FIGS. 9A-10B may be used extend the communications range of an EHT PPDU.

Figure 11:
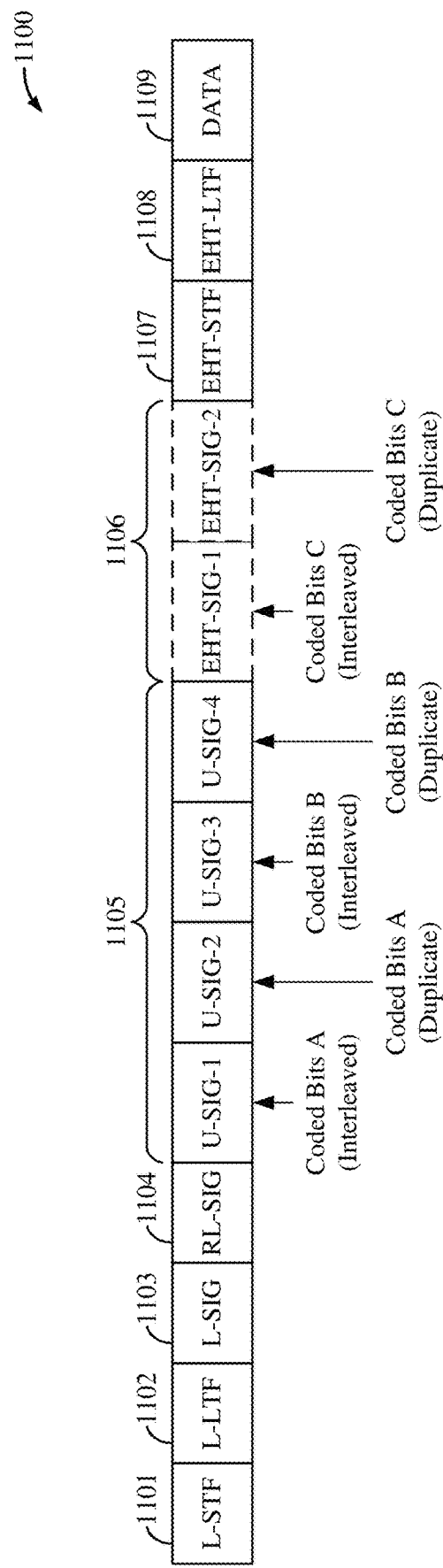
FIG. 11 shows an example extended range (ER) single-user (SU) PPDU according to some implementations.

FIG. 11 shows an example ER PPDU 1100 according to some implementations. In some implementations, the ER PPDU 1100 may be one example of the PPDU 600 of FIG. 6. More specifically, the ER PPDU 1100 may be used for wireless communications over extended ranges such as, for example, in outdoor environments. The ER PPDU 1100 includes an L-STF 1101, an L-LTF 1102, an L-SIG 1103, an RL-SIG 1104, a U-SIG 1105, an EHT-STF 1107, an EHT-LTF 1108, and a data field 1109 which may correspond to L-STF 608, L-LTF 610, L-SIG 612, RL-SIG 614, U-SIG 616, EHT-STF 622, EHT-LTF 624, and the data field 626, respectively, of the PPDU 600. In some implementations, the ER PPDU 1100 may also include an EHT-SIG 1106 which may correspond to EHT-SIG 618 of the PPDU 600.

In some implementations, to improve the reliability and robustness of the ER PPDU 1100 over greater distances, U-SIG 1105 may be repeated (in the time domain). For example, the information in U-SIG 1105 may be carried on two unique U-SIG symbols. However, with repetition, the same information may be duplicated or repeated on two additional U-SIG symbols. As a result, U-SIG 1105 may have an overall symbol duration equal to four U-SIG symbols U-SIG-1, U-SIG-2, U-SIG-3, and U-SIG-4. In some implementations, U-SIG-2 may be a duplicate or repetition of U-SIG-1 and U-SIG-4 may be a duplicate or repetition of U-SIG-3. In other words, U-SIG-1 and U-SIG-2 may carry the same coded bits (coded bits A) and U-SIG-3 and U-SIG-4 may carry the same coded bits (coded bits B).

In some aspects, interleaving techniques may be used to reorder the coded bits carried on each of U-SIG-1 and U-SIG-3. As a result, an order of the coded bits carried on U-SIG-1 may be different than an order of the coded bits carried on U-SIG-2 and an order of the coded bits carried on U-SIG-3 may be different than an order of the coded bits carried on U-SIG-4. For example, the sequence of coded bits associated with each U-SIG symbol may be mapped to a corresponding sequence of modulation symbols using a known modulation scheme (such as BPSK). Each modulation symbol may be modulated on a different tone or subcarrier within a 20 MHz subchannel. In some instances, interference in the wireless channel (such as a deep fade) may prevent the transmission of modulation symbols on one or more of the subcarriers. Thus, by changing the order in which the modulation symbols are modulated on the different subcarriers (between duplicate U-SIG symbols), aspects of the present disclosure may increase transmit diversity and further improve the signaling gains achievable through repetition of U-SIG symbols. In some implementations, the coded bits carried on U-SIG-1 and U-SIG-3 may go through interleaving, while the coded bits carried on U-SIG-2 and U-SIG-4 may not go through interleaving.

In some implementations, U-SIG-2 may be modulated according to a different modulation scheme than U-SIG-1 to indicate the presence of repetitions in U-SIG 1105. For example, U-SIG-1 may be modulated using BPSK and U-SIG-2 may be modulated using quadrature BPSK (QBPSK). In response to detecting the change in modulation scheme from U-SIG-1 to U-SIG-2 (or detecting that U-SIG-2 is modulated according to QBPSK), a receiving device may continue listening for two additional U-SIG symbols (U-SIG-3 and U-SIG-4). In some implementations, repetitions in U-SIG 1105 may be present in other non-legacy PPDU formats (in addition to the ER PPDU format). Thus, changing the modulation scheme associated with U-SIG-2 may not be sufficient, by itself, to classify the PPDU 1100 as an ER PPDU.

In some implementations, a PHY version identifier in U-SIG 1105 may further differentiate the ER PPDU 1100 from other non-legacy PPDU formats. The PHY version identifier may indicate a version of the wireless communication protocols associated with the PPDU 1100. With reference for example to FIG. 6, the version identifier may be provided as a subfield of the version-independent fields 632 of U-SIG 616. In some implementations, the PPDU 1100 may be classified as an ER PPDU when the PHY version identifier subfield of U-SIG 1105 indicates the IEEE 802.11be amendment of the IEEE 802.11 standards. In other words, a receiving device may determine that the PPDU 1100 is formatted as an ER PPDU by detecting the repetition in U-SIG 1105 (based on the modulation scheme associated with U-SIG-2) and determining that the PPDU 1100 is transmitted in accordance with the IEEE 802.11be amendment of the IEEE 802.11 standards (based on the version identifier subfield of U-SIG 1105).

In some implementations, the ER PPDU 1100 may further include EHT-SIG 1106. In some aspects, EHT-SIG 1106 may carry one or more bits of overflow from U-SIG 1105. In some other aspects, EHT-SIG 1106 may carry user-specific information for one or more recipients of the ER PPDU 1100. For example, EHT-SIG 1106 may include a user-specific field with a single user field, if the ER PPDU is for transmission to a single user. In some implementations, the ER PPDU 1100 may be formatted in accordance with the MU PPDU format, for a single user such as described with reference to FIG. 8. Further, EHT-SIG 1106 may be transmitted with a fixed code rate and a fixed modulation scheme optimized for ER communications. For example, in some aspects, the information carried on EHT-SIG 1106 may be encoded at a rate equal to ½ and may be modulated in accordance with a BPSK modulation scheme. In some implementations, the information carried on EHT-SIG 1106 may be encoded at a rate equal to ½ and may be modulated in accordance with a BPSK modulation and dual carrier modulation (DCM) scheme.

In some implementations, EHT-SIG 1106 also may be repeated (in time). In the example of FIG. 11, the information in EHT-SIG 1106 may be carried on one unique EHT-SIG symbol. However, with repetition, the same information may be duplicated or repeated on an additional EHT-SIG symbol. Accordingly, EHT-SIG 1106 may have an overall symbol duration equal to two EHT-SIG symbols EHT-SIG-1 and EHT-SIG-2. In some implementations, EHT-SIG-2 may be a duplicate or repetition of EHT-SIG-1. In other words, EHT-SIG-1 and EHT-SIG-2 may carry the same coded bits (coded bits C). In some aspects, interleaving techniques may be used to reorder the coded bits carried on EHT-SIG-1, for example, to increase transmit diversity and further improve the signaling gains achievable through repetition of EHT-SIG symbols. In some implementations, the coded bits carried on EHT-SIG-1 may go through interleaving, while the coded bits carried on EHT-SIG-2 may not go through interleaving. A receiving device may detect the presence of repetition in EHT-SIG based on the modulation scheme associated with U-SIG-2 (or a change in modulation schemes between U-SIG-1 and U-SIG-2).

In some other implementations, EHT-SIG 1106 may be omitted from the ER PPDU 1100 for transmission to a single user (also referred to as an ER SU PPDU), when the ER PPDU is only used for transmission to a single user. As a result, one or more fields or subfields that would otherwise be included in EHT-SIG 1106 (such as the user field or U-SIG overflow) may instead be combined with U-SIG 1105. To support the additional signaling in U-SIG 1105, without increasing overhead, some fields or subfields associated with U-SIG 1105 or EHT-SIG 1106 may be omitted and some of the fields or subfields of U-SIG 1105 or EHT-SIG 1106 may be shortened or condensed. For example, because the ER PPDU 1100 is intended only for a single receiving device, the STA ID subfield may be omitted from the user field. More specifically, the receiving device may determine the STA ID from the MAC header of the ER PPDU 1100. By eliminating EHT-SIG 1106, a number of fields or subfields carrying signaling for EHT-SIG 1106 can be omitted from U-SIG 1105 (such as EHT-SIG compression, EHT-SIG MCS, and number of EHT-SIG symbols). The PPDU format (or PPDU type) subfield also can be omitted from U-SIG 1105 because classification of the ER PPDU is based on the modulation scheme associated with U-SIG-2 and the PHY version identifier subfield.

Aspects of the present disclosure further recognize that, to support extended range communications, the ER PPDU 1100 may be transmitted at a relatively low data rate (such as MCS0-MSC3), on a limited number of spatial streams (such as 1 or 2 spatial streams), within a single 20 MHz subchannel (and the data portion 1109 may be transmitted on an even smaller subset of tones or subcarriers within the 20 MHz subchannel). Given such limitations on the ER PPDU format, a number of fields or subfields of U-SIG 1105 may be shortened or condensed (such as bandwidth, MCS, and number of LTFs and midamble periodicity) and a number of additional fields or subfields may be omitted from U-SIG 1105 (such as punctured channel information). In some implementations, two or more fields or subfields of U-SIG 1105 may be jointly encoded to further reduce signaling overhead. For example, a single set of CRC and tail bits may be associated with multiple fields of U-SIG 1105. By omitting, shortening, and consolidating fields in U-SIG 1105, information that would otherwise be transmitted in EHT-SIG 1106 may instead be transmitted in U-SIG 1105 without increasing the size or length of U-SIG 1105.

Figure 12:
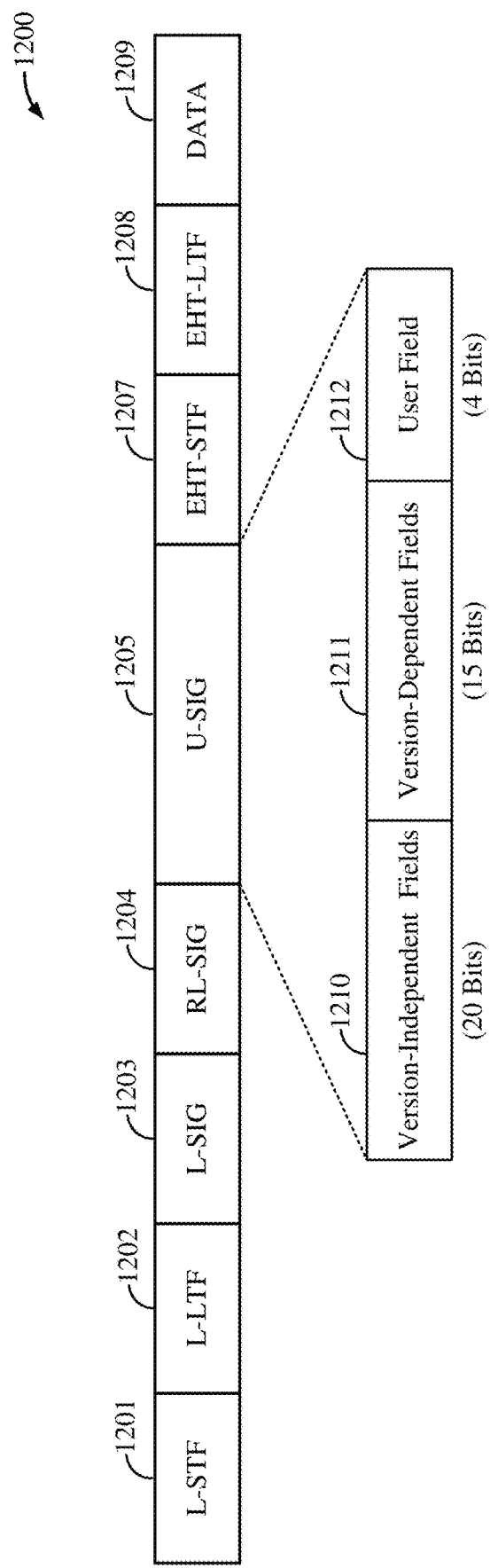
FIG. 12 shows an example frame structure for an ER SU PPDU according to some implementations.

FIG. 12 shows an example frame structure for an ER PPDU 1200 according to some implementations. In some implementations, the ER PPDU 1200 may be one example of the ER PPDU 1100 of FIG. 11. The ER PPDU 1100 includes an L-STF 1201, an L-LTF 1202, an L-SIG 1203, an RL-SIG 1204, a U-SIG 1205, an EHT-STF 1207, an EHT-LTF 1208, and a data field 1209 which may correspond to L-STF 1101, L-LTF 1102, L-SIG 1103, RL-SIG 1104, U-SIG 1105, EHT-STF 1107, EHT-LTF 1108, and the data field 1109, respectively, of the ER PPDU 1100. In the example of FIG. 12, the ER PPDU 1200 does not include an EHT-SIG. Rather, U-SIG 1205 includes a set of version-independent fields 1210, a set of version-dependent fields 1211, and a user field 1212.

In the version independent fields 1210 may include a PHY version identifier subfield (3 bits), an uplink or downlink subfield (1 bit), a transmit opportunity (TXOP) duration subfield (7 bits), a BSS color subfield (6 bits), and a PPDU bandwidth subfield (3 bits). Accordingly, the version-independent fields 1210 may be 20 bits in length.

In some implementations, the version-dependent fields 1211 may include a spatial reuse subfield (4 bits), a guard interval (GI) and LTF size subfield (2 bits), an LDPC extra symbol segment subfield (1 bit), a number of spatial streams (NSS) and midamble periodicity subfield (2 bits), a Doppler subfield (1 bit), an STBC subfield (1 bit), a beam change subfield (1 bit), a pre-FEC padding factor subfield (2 bits), and a packet extension (PE) disambiguity subfield (1 bit). Accordingly, the version-dependent fields 1211 may be 15 bits in length. In some implementations, the user field 1212 may include a beamformed subfield (1 bit), a coding subfield (1 bit), and an MCS subfield (2 bits) which may indicate whether DCM is used (with BPSK). Accordingly, the user field 1212 may be 4 bits in length.

In the example of FIG. 12, the version-independent fields 1210, version-dependent fields 1211, and user field 1212 represent a combined 39 bits of signaling information. In some implementations, the version-independent fields 1210, version-dependent fields 1211, and user field 1212 may be jointly encoded with a single CRC (4 bits) and tail (6 bits). Thus, the signaling information in U-SIG 1205 represents a total overhead of 49 bits. By comparison, 2 U-SIG symbols can carry a combined 52 bits. Thus, in the example of FIG. 12, U-SIG 1205 may carry any relevant user-specific information (that would otherwise be carried on an EHT-SIG) with 3 unused bits to spare.

Aspects of the present disclosure recognize that EHT-SIG may not be present in some PPDU formats (such as the TB PPDU 700 of FIG. 7A or the ER PPDU 1200 of FIG. 12). The presence of EHT-SIG (or lack thereof) may affect the timing of one or more subsequent fields of the ER PPDU. With reference for example to FIG. 11, EHT-STF 1107 may follow immediately after EHT-SIG 1106 (in implementations of the ER PPDU 1100 that include EHT-SIG 1106) or immediately after U-SIG 1105 (in implementations of the ER PPDU 1100 that do not include EHT-SIG 1106). As described above, EHT-STF may be used by the receiving device to perform AGC in the receiver. More specifically, the receiving device may use EHT-STF to configure (or reconfigure) its receiver to receive the EHT modulated portion of an EHT PPDU. Thus, it is desirable for the receiving device to detect EHT-STF early such that a substantial portion of EHT-STF can be used for AGC. More specifically, the receiving device may need to know whether EHT-STF follows immediately after U-SIG or after EHT-SIG.

As described above, the presence (or absence) of EHT-SIG depends on the PPDU format being implemented for a particular transmission. In the present implementations, the ER PPDU format is classified based in part on a version identifier carried on U-SIG. However, decoding and processing the information in U-SIG consumes time and resources, which may delay the detection or processing of EHT-STF. In some implementations, the presence (or absence) of EHT-SIG in an ER PPDU preamble may be indicated by changing the modulation scheme associated with one or more U-SIG symbols. For example, the third symbol of U-SIG (U-SIG-3) may be modulated according to QBPSK or BPSK to indicate that EHT-SIG is present or absent, respectively, from the preamble. In response to detecting that U-SIG-3 is modulated using QBPSK, a receiving device may anticipate EHT-STF to occur at least two symbol durations (corresponding to the duration EHT-SIG) after U-SIG (such as described with reference to FIG. 9A). In response to detecting that U-SIG-3 is modulated using BPSK, a receiving device may anticipate EHT-STF to occur immediately after U-SIG (such as described with reference to FIG. 9B).

As described above, the presence of EHT-SIG also may provide a buffer (or additional time) for the receiving device to decode and process the information in U-SIG, and thus determine the start of EHT-STF. In other words, when EHT-SIG is present in the preamble, the receiving device can determine the presence of EHT-SIG based on the PPDU format indicated in U-SIG before it begins receiving EHT-STF (such as described with reference to FIG. 10A). However, when EHT-SIG is absent from the preamble, the receiving device may not be able to determine the absence of EHT-SIG (based on the PPDU format indicated in U-SIG) before it begins receiving EHT-STF. In some implementations, one or more padding symbols may be inserted between U-SIG and EHT-STF, in the absence of EHT-SIG, to provide a buffer for the receiving device to decode and process the information in U-SIG and thus determine the start of EHT-STF (such as described with reference to FIG. 10B).

Figure 13A:
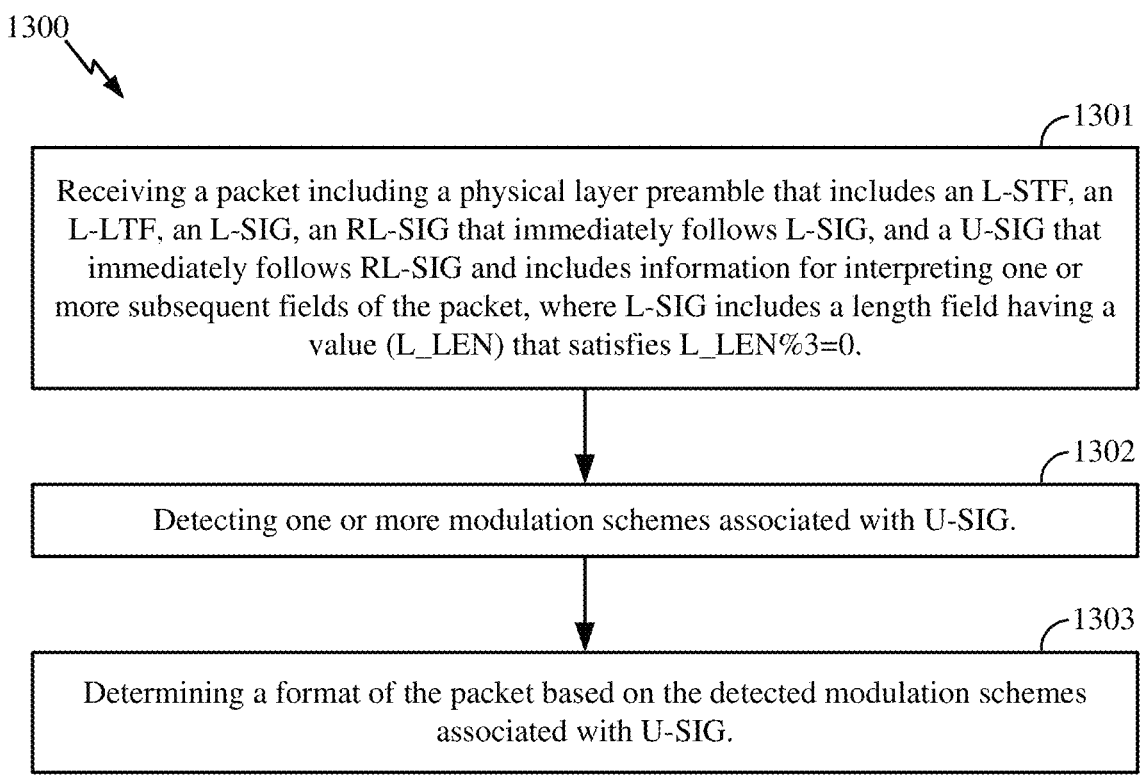
FIG. 13A shows a flowchart illustrating an example process for wireless communication that supports PHY preamble designs according to some implementations.

FIG. 13A shows a flowchart illustrating an example process 1300 for wireless communication that supports PHY preamble designs according to some implementations. In some implementations, the process 1300 may be performed by a wireless communication device operating as or within a STA such as one of the STAs 104 or 504 of FIGS. 1 and 5B, respectively. In some other implementations, the process 1300 may be performed by a wireless communication device operating as or within an AP such as one of the APs 102 or 502 of FIGS. 1 and 5A, respectively.

In some implementations, the process 1300 begins in block 1301 by receiving a packet including a physical layer preamble that includes an L-STF, an L-LTF, an L-SIG, an RL-SIG that immediately follows L-SIG, and a U-SIG that immediately follows RL-SIG and includes information for interpreting one or more subsequent fields of the packet, where L-SIG includes a length field having a value (L_LEN) that satisfies L_LEN %3=0. In block 1302, the process 1300 proceeds with detecting one or more modulation schemes associated with U-SIG. In block 1303, the process 1300 proceeds with determining a format of the packet based on the detected modulation schemes associated with U-SIG.

Figure 13B:
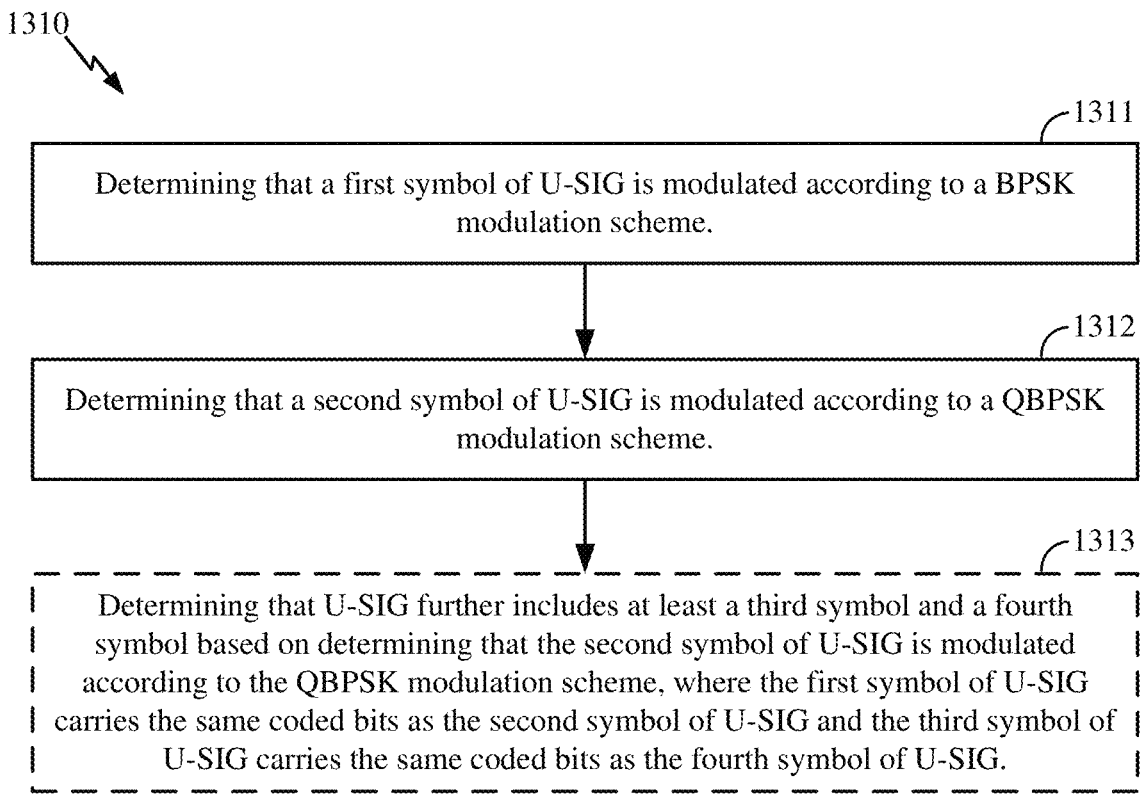
FIG. 13B shows a flowchart illustrating an example process for wireless communication that supports PHY preamble designs according to some other implementations.

FIG. 13B shows a flowchart illustrating an example process 1310 for wireless communication that supports PHY preamble designs according to some implementations. In some implementations, the process 1310 may be performed by a wireless communication device operating as or within a STA such as one of the STAs 104 or 504 of FIGS. 1 and 5B, respectively. In some other implementations, the process 1310 may be performed by a wireless communication device operating as or within an AP such as one of the APs 102 or 502 of FIGS. 1 and 5A, respectively.

With reference for example to FIG. 13A, the process 1310 may be a more detailed implementation of the operation for detecting the one or more modulation schemes associated with U-SIG in block 1302 of the process 1300. For example, the process 1310 may begin, in block 1311, after the reception of the packet in block 1301 and before the determination of the format of the packet in block 1303. In block 1311, the process 1310 begins by determining that a first symbol of U-SIG is modulated according to a BPSK modulation scheme. In block 1312, the process 1310 proceeds with determining that a second symbol of U-SIG is modulated according to a QBPSK modulation scheme. In some implementations, the process 1310 may proceed to block 1313 with determining that U-SIG further includes at least a third symbol and a fourth symbol based on determining that the second symbol of U-SIG is modulated according to the QBPSK modulation scheme, where the first symbol of U-SIG carries the same coded bits as the second symbol of U-SIG and the third symbol of U-SIG carries the same coded bits as the fourth symbol of U-SIG.

In some implementations, each of the first and second symbols may be transmitted on a plurality of subcarriers, where the coded bits of the first symbol are modulated on the plurality of subcarriers in a different order than the coded bits of the second symbol. In some implementations, each of the third and fourth symbols may be transmitted on a plurality of subcarriers, where the coded bits of the third symbol are modulated on the plurality of subcarriers in a different order than the coded bits of the fourth symbol.

In some implementations, the packet may be determined to conform with a non-legacy ER packet format based on a value of a version identifier subfield of U-SIG and the determination that the second symbol of U-SIG is modulated according to the QBPSK modulation scheme. In some aspects, the preamble may further include a non-legacy signal field immediately following U-SIG, where the non-legacy signal field includes a single user field and one or more bits of overflow from U-SIG. In some aspects, U-SIG may include a user field carrying user-specific information for a single user, where the preamble further includes a non-legacy STF immediately following U-SIG.

Figure 13C:
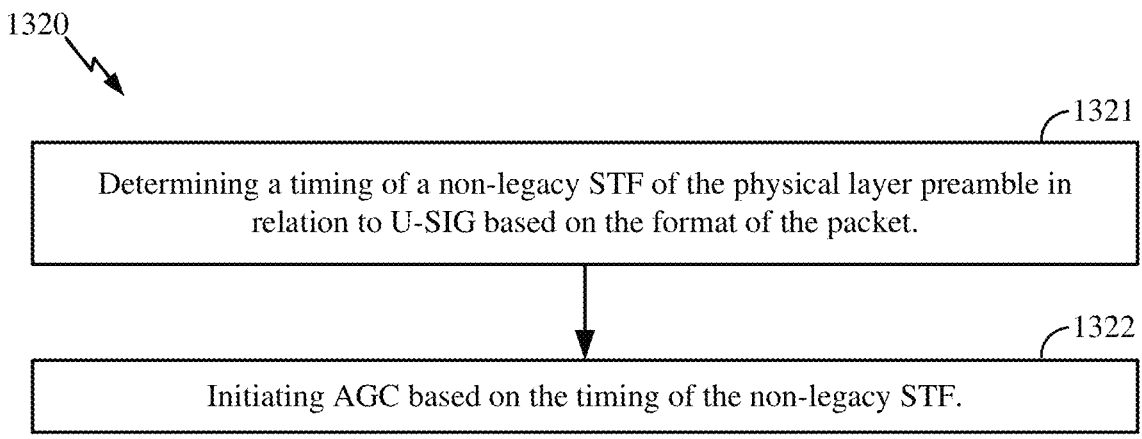
FIG. 13C shows a flowchart illustrating an example process for wireless communication that supports PHY preamble designs according to some other implementations.

FIG. 13C shows a flowchart illustrating an example process 1320 for wireless communication that supports PHY preamble designs according to some implementations. In some implementations, the process 1320 may be performed by a wireless communication device operating as or within a STA such as one of the STAs 104 or 504 of FIGS. 1 and 5B, respectively. In some other implementations, the process 1320 may be performed by a wireless communication device operating as or within an AP such as one of the APs 102 or 502 of FIGS. 1 and 5A, respectively.

With reference for example to FIG. 13A, the process 1320 may begin, in block 1321, after the determination of the format of the packet in block 1303 of the process 1300. In block 1321, the process 1320 begins by determining a timing of a non-legacy STF of the physical layer preamble in relation to U-SIG based on the format of the packet. In block 1322, the process 1320 proceeds with initiating AGC based on the timing of the non-legacy STF. In some implementations, the packet may include one or more padding symbols between U-SIG and the non-legacy STF.

Figure 14:
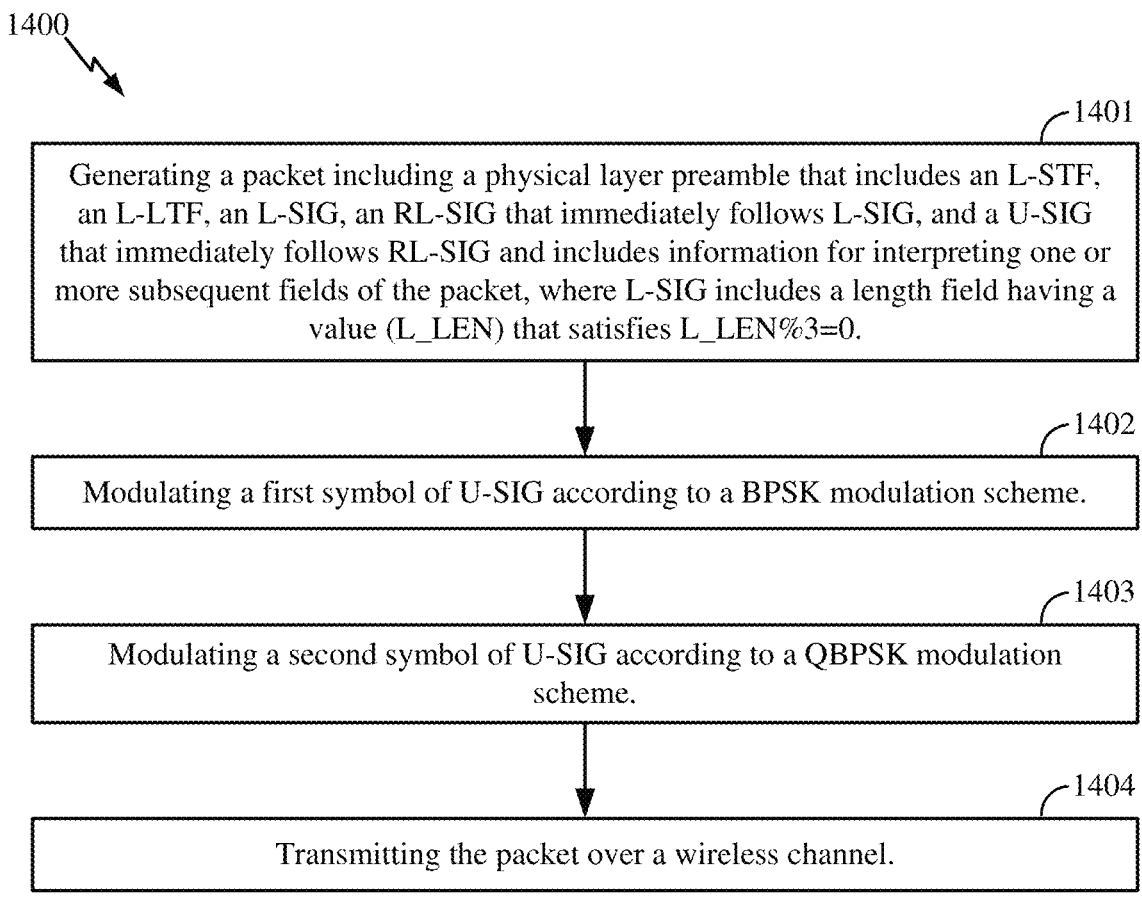
FIG. 14 shows a flowchart illustrating an example process for wireless communication that supports PHY preamble designs according to some other implementations.

FIG. 14 shows a flowchart illustrating an example process 1400 for wireless communication that supports PHY preamble designs according to some implementations. In some implementations, the process 1400 may be performed by a wireless communication device operating as or within a STA such as one of the STAs 104 or 504 of FIGS. 1 and 5B, respectively. In some other implementations, the process 1400 may be performed by a wireless communication device operating as or within an AP such as one of the APs 102 or 502 of FIGS. 1 and 5A, respectively.

In some implementations, the process 1400 begins in block 1401 by generating a packet including a physical layer preamble that includes an L-STF, an L-LTF, an L-SIG, an RL-SIG that immediately follows L-SIG, and a U-SIG that immediately follows RL-SIG and includes information for interpreting one or more subsequent fields of the packet, where L-SIG includes a length field having a value (L_LEN) that satisfies L_LEN %3=0. In block 1402, the process 1400 proceeds with modulating a first symbol of U-SIG according to a BPSK modulation scheme. In block 1403, the process 1400 proceeds with modulating a second symbol of U-SIG according to a QBPSK modulation scheme. In block 1404, the process 1400 proceeds with transmitting the packet over a wireless channel.

In some implementations, U-SIG may further include at least a third symbol and a fourth symbol, where the first symbol of U-SIG carries the same coded bits as the second symbol of U-SIG and the third symbol of U-SIG carries the same coded bits as the fourth symbol of U-SIG. In some aspects, the coded bits of the first symbol may be modulated on a plurality of subcarriers in a different order than the coded bits of the second symbol. In some aspects, the coded bits of the third symbol may be modulated on the plurality of subcarriers in a different order than the coded bits of the fourth symbol. In some aspects, the packet may include one or more padding symbols between U-SIG and a non-legacy STF of the physical layer preamble.

In some implementations, the packet may conform with a non-legacy ER packet format having a bandwidth equal to 20 MHz. In some aspects, the preamble may further include a non-legacy signal field immediately following U-SIG, where the non-legacy signal field includes a single user field and one or more bits of overflow from U-SIG. In some aspects, U-SIG may further include a user field carrying user-specific information for a single user, where the preamble further includes a non-legacy STF immediately following U-SIG.

The wireless range of a wireless communication device may be related to its transmit power level. For example, wireless signals transmitted at higher power levels typically travel farther than wireless signals transmitted at lower power levels. Many governmental agencies and regulations impose a power spectral density (PSD) limit on the transmission power of wireless communication device. PSD limits may restrict the total transmit power, as well as the energy of out-of-band transmissions, of wireless communication device. For example, a transmitting device may use a relatively low transmit power level to minimize signal distortion caused by its power amplifiers, for example, so that a receiving device is able to receive and successfully decode information modulated onto the transmitted wireless signal. The transmitting device may also maintain its transmit power at a level that ensures its power amplifiers mostly operate in the linear region, for example, to minimize signal distortion.

In some implementations, wireless communication devices disclosed herein may increase the accuracy of channel estimates by increasing the power level at which one or more long training fields (LTFs) of a packet preamble are transmitted. Specifically, increasing the transmit power level of one or more LTFs that can be used for channel estimation may increase the SINR of the one or more LTFs, which may result in more accurate channel estimates. Although allowing for more accurate channel estimates, increasing the power level at which the one or more LTFs are transmitted may cause the total output power level of the wireless communication device to violate applicable PSD limits. Additionally, increasing the power level at which the one or more LTFs are transmitted may increase an amount of signal distortion caused by non-linearities in power amplifiers provided in the transmit chains of the wireless communication device.

Accordingly, implementations of the subject matter disclosed herein may allow a wireless communication device to transmit one or more LTFs of a packet preamble at a greater power level to achieve more accurate channel estimates without violating applicable PSD limits and without signal distortion. In some implementations, the wireless communication device may apply an additional amount transmit power to the one or more LTFs, and may adjust the transmit power level applied to other portions of the packet based on the additional amount of transmit power, a duration of the one or more LTFs, and the PSD limit to maintain the total output power level of the wireless communication device over the frequency bandwidth to below the PSD limit. PSD limits are typically defined on a per-frequency segment basis (such as 5 dBm/MHz for APs and −1 dBm/MHz for non-AP STAs in certain frequency spectrums). As such, wireless communication devices that transmit wireless packets over relatively large frequency bandwidths may use greater transmit power levels than wireless communication devices that transmit wireless packets over relatively small frequency bandwidths.

Additionally, PSD limits are typically based on the total output power of a wireless communication device measured over a period of time, rather than based on instantaneous transmit power levels. As such, a wireless communication device may increase the transmit power level of one or more LTFs (to increase the accuracy of channel estimates) and comply with applicable PSD limits by reducing the transmit power level of one or more other portions of the packet by an amount and for a duration that compensates for the increased transmit power level applied to the LTFs.

Figure 15:
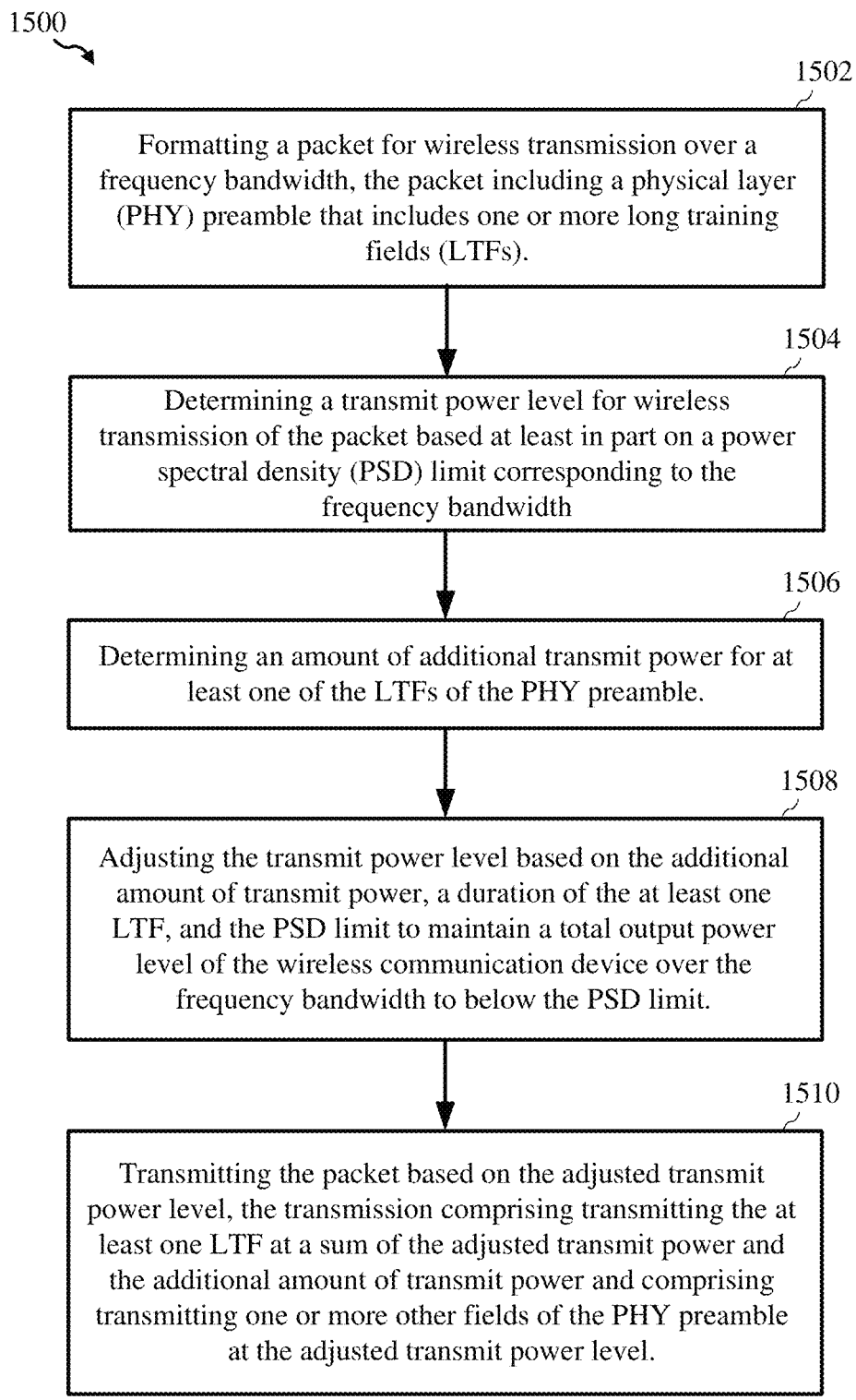
FIG. 15 shows a flowchart illustrating an example process for wireless communication that supports increasing the transmit power of a training field of a PHY preamble according to some implementations.

FIG. 15 shows a flowchart illustrating an example process 1500 for wireless communication that supports increasing the transmit power of a training field of a PHY preamble according to some implementations. In some implementations, the process 1500 may be performed by a wireless communication device operating as or within a STA such as one of the STAs 104 or 504 of FIGS. 1 and 5B, respectively. In some other implementations, the process 1500 may be performed by a wireless communication device operating as or within an AP such as one of the APs 102 or 502 of FIGS. 1 and 5A, respectively.

In some implementations, the process 1500 begins in block 1502 by formatting a packet for wireless transmission over a frequency bandwidth, the packet including a physical layer (PHY) preamble that includes one or more long training fields (LTFs). In block 1504, the process 1500 proceeds with determining a transmit power level for wireless transmission of the packet based at least in part on a power spectral density (PSD) limit corresponding to the frequency bandwidth. In block 1506, the process 1500 proceeds with determining an amount of additional transmit power for at least one of the LTFs of the PHY preamble. In block 1508, the process 1500 proceeds with adjusting the transmit power level based on the additional amount of transmit power, a duration of the at least one LTF, and the PSD limit to maintain a total output power level of the wireless communication device over the frequency bandwidth to below the PSD limit. In block 1510, the process 1500 proceeds with transmitting the packet based on the adjusted transmit power level, the transmission comprising transmitting the at least one LTF at a sum of the adjusted transmit power and the additional amount of transmit power and comprising transmitting one or more other fields of the PHY preamble at the adjusted transmit power level. In some implementations, the at least one LTF may be one or more of a legacy LTF (L-LTF), a high-throughput (HT) LTF (HT-LTF), a high-efficiency (HE) LTF (HE-LTF), or an extremely high throughput (EHT) LTF (EHT-LTF)

In some implementations, the determining of the boosted amount of transmit power for the at least one LTF may be further based on a signal-to-interference-plus-noise ratio (SINR) associated with the transmission of the packet. In some other implementations, the determining of the boosted amount of transmit power for the at least one LTF may be further based on a signal-to-interference-plus-noise ratio (SINR) threshold for channel estimation.

In some implementations, the determining of the transmit power level may be further based on a number of tones used to transmit the preamble. In some other implementations, the determining of the transmit power level may be further based on a distribution of the number of tones across the frequency bandwidth.

In some implementations, the adjusting of the transmit power level may be further based on an output power backoff (OBO) value. In some instances, the OBO value may be selected to reduce signal distortion caused by one or more power amplifiers of the wireless communication device while maintaining a total transmit power of the wireless communication device within the corresponding PSD limit.

Figure 16:
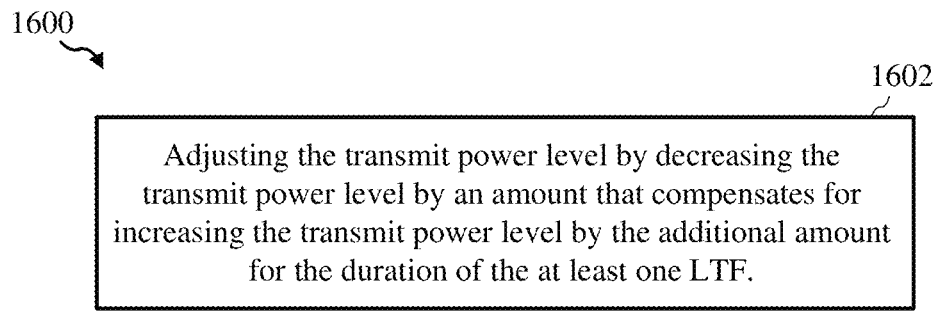
FIG. 16 shows a flowchart illustrating an example process for wireless communication that supports increasing the transmit power of a training field of a PHY preamble according to some other implementations.

FIG. 16 shows a flowchart illustrating an example process 1600 for wireless communication that supports increasing the transmit power of a training field of a PHY preamble according to some other implementations. In some implementations, the process 1600 may be performed by a wireless communication device operating as or within a STA such as one of the STAs 104 or 504 of FIGS. 1 and 5B, respectively. In some other implementations, the process 1600 may be performed by a wireless communication device operating as or within an AP such as one of the APs 102 or 502 of FIGS. 1 and 5A, respectively.

With reference for example to FIG. 15, the process 1600 may be a more detailed implementation of the operation for adjusting the transmit power level in block 1508 of the process 1500. For example, the process 1600 begins in block 1602 with the wireless communication device adjusting the transmit power level by decreasing the transmit power level by an amount that compensates for increasing the transmit power level by the additional amount for the duration of the at least one LTF. In this way, wireless communication devices configured to implement one or more aspects of the subject matter disclosed herein may transmit the LTF at a higher power level than other portions of the packet without violating applicable PSD limits. The ability to increase the transmit power level of the LTF may increase the SINR of the transmitted packet, for example, to achieve better channel estimates (such as compared with transmitting the packet without increasing the transmit power level of the LTF).

Figure 17:
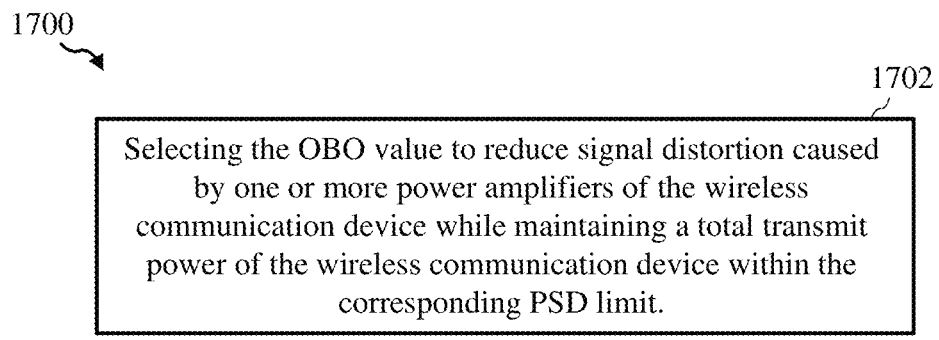
FIG. 17 shows a flowchart illustrating an example process for wireless communication that supports increasing the transmit power of a training field of a PHY preamble according to some other implementations.

FIG. 17 shows a flowchart illustrating an example process 1700 for wireless communication that supports increasing the transmit power of a training field of a PHY preamble according to some other implementations. In some implementations, the process 1700 may be performed by a wireless communication device operating as or within a STA such as one of the STAs 104 or 504 of FIGS. 1 and 5B, respectively. In some other implementations, the process 1700 may be performed by a wireless communication device operating as or within an AP such as one of the APs 102 or 502 of FIGS. 1 and 5A, respectively.

In some implementations, the process 1700 begins in block 1702 by selecting the OBO value to reduce signal distortion caused by one or more power amplifiers of the wireless communication device while maintaining a total transmit power of the wireless communication device within the corresponding PSD limit.

Figure 18:
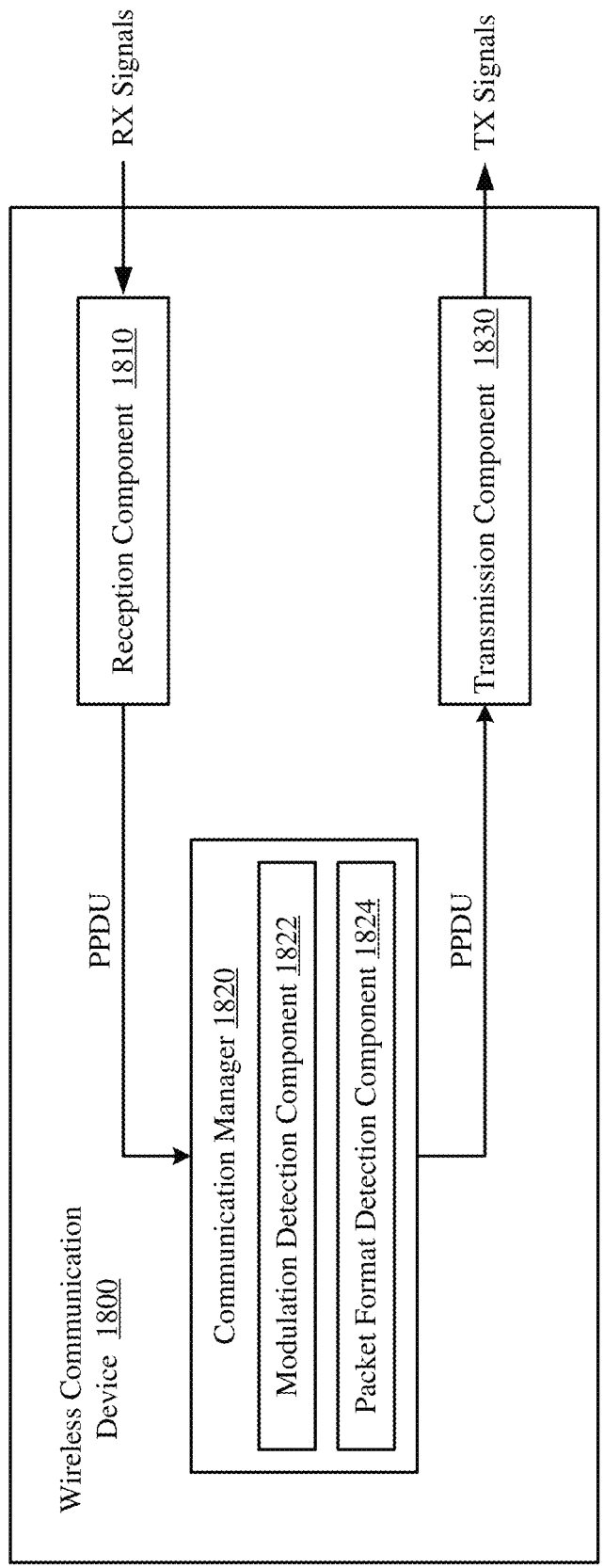
FIG. 18 shows a block diagram of an example wireless communication device according to some implementations.

FIG. 18 shows a block diagram of an example wireless communication device 1800 according to some implementations. In some implementations, the wireless communication device 1800 is configured to perform any of the processes 1300, 1310, or 1320 described above with reference to FIG. 13A, 13B, or 13C, respectively. In some implementations, the wireless communication device 1800 can be an example implementation of the wireless communication device 400 described above with reference to FIG. 4. For example, the wireless communication device 1800 can be a chip, SoC, chipset, package or device that includes at least one processor and at least one modem (for example, a Wi-Fi (IEEE 802.11) modem or a cellular modem).

The wireless communication device 1800 includes a reception component 1810, a communication manager 1820, and a transmission component 1830. The communication manager 1820 may further include a modulation detection component 1822 and a packet format detection component 1824. Portions of one or more of the components 1822 and 1824 may be implemented at least in part in hardware or firmware. In some implementations, at least some of the components 1822 or 1824 are implemented at least in part as software stored in a memory (such as the memory 408). For example, portions of one or more of the components 1822 and 1824 can be implemented as non-transitory instructions (or "code") executable by a processor (such as the processor 406) to perform the functions or operations of the respective component.

The reception component 1810 is configured to receive RX signals from one or more other wireless communication devices. In some implementations, the reception component 1810 may receive a packet or PPDU including a PHY preamble that includes an L-STF, an L-LTF, an L-SIG, an RL-SIG that immediately follows L-SIG, and a U-SIG that immediately follows RL-SIG and includes information for interpreting one or more subsequent fields of the packet or PPDU, where L-SIG includes a length field having a value (L_LEN) that satisfies L_LEN %3=0. The communication manager 1820 is configured to manage communications with the other wireless communication devices. In some implementations, the modulation detection component 1822 may detect one or more modulation schemes associated with U-SIG; and the packet format detection component 1824 may determine a format of the packet or PPDU based on the detected modulation schemes and the information in U-SIG. The transmission component 1830 is configured to transmit TX signals to one or more other wireless communication devices.

Figure 19:
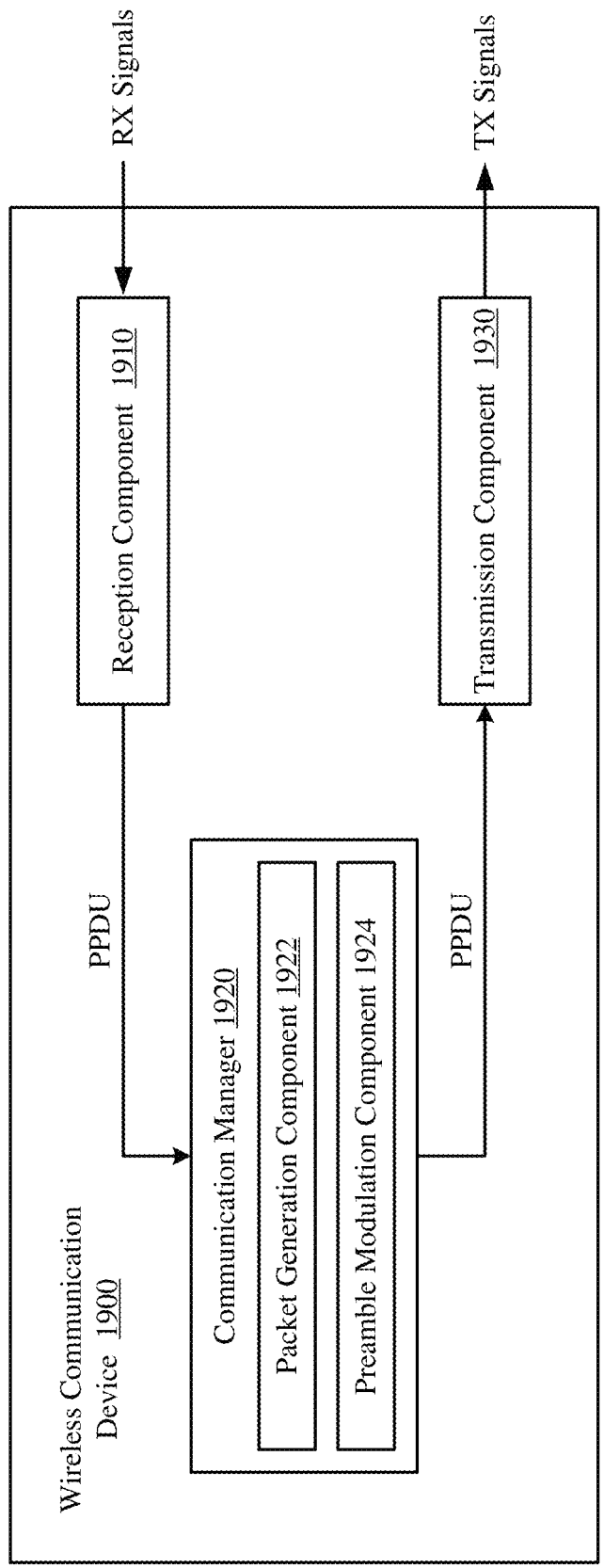
FIG. 19 shows a block diagram of an example wireless communication device according to some implementations.

FIG. 19 shows a block diagram of an example wireless communication device 1900 according to some implementations. In some implementations, the wireless communication device 1900 is configured to perform the process 1400 described above with reference to FIG. 14. In some implementations, the wireless communication device 1900 can be an example implementation of the wireless communication device 400 described above with reference to FIG. 4. For example, the wireless communication device 1900 can be a chip, SoC, chipset, package or device that includes at least one processor and at least one modem (for example, a Wi-Fi (IEEE 802.11) modem or a cellular modem).

The wireless communication device 1900 includes a reception component 1910, a communication manager 1920, and a transmission component 1930. The communication manager 1920 may further include a packet generation component 1922 and a preamble modulation component 1924. Portions of one or more of the components 1922 and 1924 may be implemented at least in part in hardware or firmware. In some implementations, at least some of the components 1922 or 1924 are implemented at least in part as software stored in a memory (such as the memory 408). For example, portions of one or more of the components 1922 and 1924 can be implemented as non-transitory instructions (or "code") executable by a processor (such as the processor 406) to perform the functions or operations of the respective component.

The reception component 1910 is configured to receive RX signals from one or more other wireless communication devices. The communication manager 1920 is configured to manage communications with the other wireless communication devices. In some implementations, the packet generation component 1922 may generate a packet or PPDU including a PHY preamble that includes an L-STF, an L-LTF, an L-SIG, an RL-SIG that immediately follows L-SIG, and a U-SIG that immediately follows RL-SIG and includes information for interpreting one or more subsequent fields of the packet or PPDU, where L-SIG includes a length field having a value (L_LEN) that satisfies L_LEN %3=0; and the preamble modulation component 1924 may modulate a first symbol of U-SIG according to a first modulation scheme and modulate a second symbol of U-SIG according to a second modulation scheme different than the first modulation scheme. The transmission component 1930 is configured to transmit TX signals to one or more other wireless communication devices. In some implementations, the transmission component 1930 may transmit the packet or PPDU over a wireless channel.

Implementation examples are described in the following numbered clauses:

1. A method for wireless communication by a wireless communication device, including:
  receiving a packet including a physical layer preamble that includes a legacy short training field (L-STF), a legacy long training field (L-LTF), a legacy signal field (L-SIG), a repeat of L-SIG (RL-SIG) that immediately follows L-SIG, and a universal signal field (U-SIG) that immediately follows RL-SIG and includes information for interpreting one or more subsequent fields of the packet, L-SIG including a length field having a value (L_LEN) that satisfies L_LEN %3=0;
  detecting one or more modulation schemes associated with U-SIG; and
  determining a format of the packet based on the detected modulation schemes associated with U-SIG.

2. The method of clause 1, where the detecting of the one or more modulation schemes includes:
  determining that a first symbol of U-SIG is modulated according to a binary phase shift keying (BPSK) modulation scheme; and
  determining that a second symbol of U-SIG is modulated according to a quadrature BPSK (QBPSK) modulation scheme.

3. The method of any of clauses 1 or 2, where the determining of the format of the packet includes:
  determining that U-SIG further includes at least a third symbol and a fourth symbol based on determining that the second symbol of U-SIG is modulated according to the QBPSK modulation scheme, the first symbol of U-SIG carrying the same coded bits as the second symbol of U-SIG and the third symbol of U-SIG carrying the same coded bits as the fourth symbol of U-SIG.

4. The method of any of clauses 1-3, where each of the first and second symbols is transmitted on a plurality of subcarriers, the coded bits of the first symbol being modulated on the plurality of subcarriers in a different order than the coded bits of the second symbol.

5. The method of any of clauses 1-4, where each of the third and fourth symbols is transmitted on a plurality of subcarriers, the coded bits of the third symbol being modulated on the plurality of subcarriers in a different order than the coded bits of the fourth symbol.

6. The method of any of clauses 1-5, further including:
  determining a timing of a non-legacy short training field (STF) of the physical layer preamble in relation to U-SIG based on the format of the packet; and
  initiating automatic gain control (AGC) based on the timing of the non-legacy STF.

7. The method of any of clauses 1-6, where the packet includes one or more padding symbols between U-SIG and the non-legacy STF.

8. The method of any of clauses 1-7, where the determining of the format of the packet includes:
  determining that the packet conforms with a non-legacy extended range (ER) packet format based on a value of a version identifier subfield of U-SIG and the determination that the second symbol of U-SIG is modulated according to the QBPSK modulation scheme.

9. The method of any of clauses 1-8, where the preamble further includes a non-legacy signal field immediately following U-SIG, the non-legacy signal field including a single user field and one or more bits of overflow from U-SIG.

10. The method of any of clauses 1-8, where U-SIG includes a user field carrying user-specific information for a single user, the preamble further includes a non-legacy STF immediately following U-SIG.

11. A wireless communication device including:
  at least one modem;
  at least one processor communicatively coupled with the at least one modem; and
  at least one memory communicatively coupled with the at least one processor and storing processor-readable code that, when executed by the at least one processor in conjunction with the at least one modem, is configured to perform the method of any one or more of clauses 1-10.

12. A method for wireless communication performed by a wireless communication device, including:
  generating a packet including a physical layer preamble that includes a legacy short training field (L-STF), a legacy long training field (L-LTF), a legacy signal field (L-SIG), a repeat of L-SIG (RL-SIG) that immediately follows L-SIG, and a universal signal field (U-SIG) that immediately follows RL-SIG and includes information for interpreting one or more subsequent fields of the packet, L-SIG including a length field having a value (L_LEN) that satisfies L_LEN %3=0;
  modulating a first symbol of U-SIG according to a binary phase shift keying (BPSK) modulation scheme;
  modulating a second symbol of U-SIG according to a quadrature BPSK (QBPSK) modulation scheme; and
  transmitting the packet over a wireless channel.

13. The method of clause 12, where U-SIG further includes at least a third symbol and a fourth symbol, the first symbol of U-SIG carrying the same coded bits as the second symbol of U-SIG and the third symbol of U-SIG carrying the same coded bits as the fourth symbol of U-SIG.

14. The method of any of clauses 12 or 13, where the coded bits of the first symbol are modulated on a plurality of subcarriers in a different order than the coded bits of the second symbol.

15. The method of any of clauses 12-14, where the coded bits of the third symbol are modulated on the plurality of subcarriers in a different order than the coded bits of the fourth symbol.
16. The method of any of clauses 12-15, where the packet includes one or more padding symbols between U-SIG and a non-legacy short training field (STF) of the physical layer preamble.
17. The method of any of clauses 12-16, where the packet conforms with a non-legacy extended range (ER) packet format having a bandwidth equal to 20 MHz.
18. The method of any of clauses 12-17, where the preamble further includes a non-legacy signal field immediately following U-SIG, the non-legacy signal field including a single user field and one or more bits of overflow from U-SIG.
19. The method of any of clauses 12-17, where U-SIG includes a user field carrying user-specific information for a single user, the preamble further including a non-legacy STF immediately following U-SIG.
20. A wireless communication device including:
at least one modem;
at least one processor communicatively coupled with the at least one modem; and
at least one memory communicatively coupled with the at least one processor and storing processor-readable code that, when executed by the at least one processor in conjunction with the at least one modem, is configured to perform the method of any one or more of clauses 12-19.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:
1. A method for wireless communication by a wireless communication device comprising:
receiving a packet including a physical layer preamble that includes a legacy short training field (L-STF), a legacy long training field (L-LTF), a legacy signal field (L-SIG), a repeat of L-SIG (RL-SIG) that immediately follows L-SIG, and a universal signal field (U-SIG) that immediately follows RL-SIG and includes information for interpreting one or more subsequent fields of the packet, L-SIG including a length field having a value (L_LEN) that satisfies L_LEN mod 3 equals zero;
detecting a plurality of modulation schemes applied to U-SIG, wherein a first symbol of U-SIG is modulated according to a binary phase shift keying (BPSK) modulation scheme of the plurality of modulation schemes and a second symbol of U-SIG is modulated according to a quadrature BPSK (QBPSK) modulation scheme of the plurality of modulation schemes; and
determining the second symbol of U-SIG is a repetition of the first symbol of U-SIG based on the first symbol being modulated according to the BPSK modulation scheme and the second symbol being modulated according to the QBPSK modulation scheme.
2. The method of claim 1, further comprising:
determining that U-SIG further includes at least a third symbol and a fourth symbol based on determining that the second symbol of U-SIG is modulated according to the QBPSK modulation scheme, the first symbol of U-SIG carrying first coded bits that are the same as second coded bits carried by the second symbol of U-SIG, and the third symbol of U-SIG carrying third coded bits that are the same as fourth coded bits carried by the fourth symbol of U-SIG.
3. The method of claim 2, wherein each of the first and second symbols is transmitted on a plurality of subcarriers, the first coded bits of the first symbol being modulated on the plurality of subcarriers in a different order than the second symbol.
4. The method of claim 2, wherein each of the third and fourth symbols is transmitted on a plurality of subcarriers, the second coded bits of the third symbol being modulated on the plurality of subcarriers in a different order than the fourth symbol.

5. The method of claim 1, further comprising:
determining a timing of a non-legacy short training field (STF) of the physical layer preamble in relation to U-SIG based on the second symbol being the repetition of the first symbol; and
initiating automatic gain control (AGC) based on the timing of the non-legacy STF.

6. The method of claim 5, wherein the packet includes one or more padding symbols between U-SIG and the non-legacy STF.

7. The method of claim 1, further comprising:
determining that the packet conforms with a non-legacy extended range (ER) packet format based on a value of a version identifier subfield of U-SIG and the second symbol of U-SIG being modulated according to the QBPSK modulation scheme.

8. The method of claim 7, wherein the physical layer preamble further includes a non-legacy signal field following U-SIG, the non-legacy signal field including a single user field and one or more bits of overflow from U-SIG.

9. The method of claim 7, wherein U-SIG includes a user field carrying user-specific information for a single user, the physical layer preamble further including a non-legacy STF following U-SIG.

10. A wireless communication device comprising:
one or more processors;
one or more memories coupled with the one or more processors; and
one or more processor-readable instructions store in the one or more memories and executable by the one or more processors to cause the wireless communication device to:
receive a packet including a physical layer preamble that includes a legacy short training field (L-STF), a legacy long training field (L-LTF), a legacy signal field (L-SIG), a repeat of L-SIG (RL-SIG) that immediately follows L-SIG, and a universal signal field (U-SIG) that immediately follows RL-SIG and includes information for interpreting one or more subsequent fields of the packet, L-SIG including a length field having a value (L_LEN) that satisfies L_LEN mod 3 equals zero;
detect a plurality of modulation schemes applied to U-SIG, wherein a first symbol of U-SIG is modulated according to a binary phase shift keying (BPSK) modulation scheme of the plurality of modulation schemes and a second symbol of U-SIG is modulated according to a quadrature BPSK (QBPSK) modulation scheme of the plurality of modulation schemes; and
determine the second symbol of U-SIG is a repetition of the first symbol of U-SIG based on the first symbol being modulated according to the BPSK modulation scheme and the second symbol being modulated according to the QBPSK modulation scheme.

11. The wireless communication device of claim 10, wherein execution of the processor-readable instructions is further configured to:
determine that U-SIG further includes at least a third symbol and a fourth symbol based on determining that the second symbol of U-SIG is modulated according to the QBPSK modulation scheme, wherein the first symbol of U-SIG carries first coded bits that are the as second coded bits carried by the second symbol of U-SIG, and the third symbol of U-SIG carrying third coded bits that are the same as fourth coded bits carried by the fourth symbol of U-SIG.

12. The wireless communication device of claim 11, wherein the first coded bits of the first symbol are modulated on a plurality of subcarriers in a different order than the second symbol, and wherein the second coded bits of the third symbol are modulated on the plurality of subcarriers in a different order than the fourth symbol.

13. The wireless communication device of claim 10, wherein execution of the processor-readable instructions is further configured to:
determine a timing of a non-legacy short training field (STF) of the physical layer preamble in relation to U-SIG based on the second symbol being the repetition of the first symbol; and
initiate automatic gain control (AGC) based on the timing of the non-legacy STF.

14. The wireless communication device of claim 13, wherein the packet includes one or more padding symbols between U-SIG and the non-legacy STF.

15. A method for wireless communication by a wireless communication device comprising:
generating a packet including a physical layer preamble that includes a legacy short training field (L-STF), a legacy long training field (L-LTF), a legacy signal field (L-SIG), a repeat of L-SIG (RL-SIG) that immediately follows L-SIG, and a universal signal field (U-SIG) that immediately follows RL-SIG and includes information for interpreting one or more subsequent fields of the packet, L-SIG including a length field having a value (L_LEN) that satisfies L_LEN mod 3 equals zero;
selecting a plurality of modulation schemes to apply to U-SIG to indicate a presence of a repetition of one or more symbols of U-SIG;
modulating a first symbol of the one or more symbols of U-SIG according to a binary phase shift keying (BPSK) modulation scheme of the plurality of modulation schemes;
modulating a second symbol of U-SIG according to a quadrature BPSK (QBPSK) modulation scheme of the plurality of modulation schemes based at least in part on the second symbol being a repetition of the first symbol; and
transmitting the packet over a wireless channel.

16. The method of claim 15, wherein U-SIG further includes at least a third symbol of the one or more symbols and a fourth symbol, the first symbol of U-SIG carrying first coded bits that are the same as second coded bits carried by the second symbol of U-SIG, and the third symbol of U-SIG carrying third coded bits that are the same as fourth coded bits carried by the fourth symbol of U-SIG.

17. The method of claim 16, wherein the first coded bits of the first symbol are modulated on a plurality of subcarriers in a different order than the second symbol.

18. The method of claim 16, wherein the second coded bits of the third symbol are modulated on a plurality of subcarriers in a different order than the fourth symbol.

19. The method of claim 16, wherein the packet includes one or more padding symbols between U-SIG and a non-legacy short training field (STF) of the physical layer preamble.

20. The method of claim 16, wherein the packet conforms with a non-legacy extended range (ER) packet format having a bandwidth equal to 20 megahertz.

21. The method of claim 20, wherein the physical layer preamble further includes a non-legacy signal field following U-SIG, the non-legacy signal field including a single user field and one or more bits of overflow from U-SIG.

22. The method of claim 20, wherein U-SIG includes a user field carrying user-specific information for a single user, the physical layer preamble further including a non-legacy STF following U-SIG.

23. A wireless communication device comprising:
one or more processors;
one or more memories coupled with the one or more processors; and
one or more processor-readable instructions store in the one or more memories and executable by the one or more processors to cause the wireless communication device to:
generate a packet including a physical layer preamble that includes a legacy short training field (L-STF), a legacy long training field (L-LTF), a legacy signal field (L-SIG), a repeat of L-SIG (RL-SIG) that immediately follows L-SIG, and a universal signal field (U-SIG) that immediately follows RL-SIG and includes information for interpreting one or more subsequent fields of the packet, L-SIG including a length field having a value (L_LEN) that satisfies L_LEN mod 3 equals zero;
select a plurality of modulation schemes to apply to U-SIG to indicate a presence of a repetition of one or more symbols of U-SIG;
modulate a first symbol of the one or more symbols of U-SIG according to a binary phase shift keying (BPSK) modulation scheme of the plurality of modulation schemes;
modulate a second symbol of U-SIG according to a quadrature BPSK (QBPSK) modulation scheme of the plurality of modulation schemes based at least in part on the second symbol being a repetition of the first symbol; and
transmit the packet over a wireless channel.

24. The wireless communication device of claim 23, wherein U-SIG further includes at least a third symbol of the one or more symbols and a fourth symbol, the first symbol of U-SIG carrying first coded bits that are the same as second coded bits carried by the second symbol of U-SIG, and the third symbol of U-SIG carrying third coded bits that are the same as fourth coded bits carried by the fourth symbol of U-SIG.

25. The wireless communication device of claim 24, wherein the first coded bits of the first symbol are modulated on a plurality of subcarriers in a different order than the second symbol, wherein the second coded bits of the third symbol are modulated on the plurality of subcarriers in a different order than the fourth symbol.

26. The wireless communication device of claim 23, wherein the packet conforms with a non-legacy extended range (ER) packet format having a bandwidth equal to 20 megahertz.

27. The wireless communication device of claim 26, wherein the physical layer preamble further includes a non-legacy signal field following U-SIG, the non-legacy signal field including a single user field and one or more bits of overflow from U-SIG.

28. The wireless communication device of claim 26, wherein U-SIG includes a user field carrying user-specific information for a single user, the physical layer preamble further includes a non-legacy STF following U-SIG.

* * * * *